United States Patent
Taira et al.

(10) Patent No.: US 7,965,619 B2
(45) Date of Patent: Jun. 21, 2011

(54) WIRELESS COMMUNICATION SYSTEM AND COMMUNICATION CONTROL METHOD

(75) Inventors: Akinori Taira, Tokyo (JP); Yasunori Katou, Tokyo (JP); Yoshitaka Hara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 239 days.

(21) Appl. No.: 12/303,371

(22) PCT Filed: Jul. 5, 2007

(86) PCT No.: PCT/JP2007/063435
§ 371 (c)(1),
(2), (4) Date: Dec. 4, 2008

(87) PCT Pub. No.: WO2008/004609
PCT Pub. Date: Jan. 10, 2008

(65) Prior Publication Data
US 2009/0196203 A1    Aug. 6, 2009

(30) Foreign Application Priority Data

Jul. 7, 2006   (JP) .................... 2006-188541

(51) Int. Cl.
*H04J 11/00* (2006.01)
*G01R 31/08* (2006.01)
*H04K 1/10* (2006.01)
(52) U.S. Cl. ............ 370/203; 370/230.1; 375/260
(58) Field of Classification Search ......... 370/203, 370/230.1; 375/260–267
See application file for complete search history.

(56) References Cited

U.S. PATENT DOCUMENTS

| | | | |
|---|---|---|---|
| 2003/0128658 | A1 | 7/2003 | Walton et al. |
| 2004/0136349 | A1 | 7/2004 | Walton et al. |
| 2005/0032521 | A1 | 2/2005 | Lee et al. |
| 2007/0064829 | A1* | 3/2007 | Zheng et al. ............ 375/267 |
| 2007/0160156 | A1* | 7/2007 | Melzer et al. ........... 375/260 |
| 2007/0211813 | A1* | 9/2007 | Talwar et al. ........... 375/267 |

FOREIGN PATENT DOCUMENTS

| | | |
|---|---|---|
| JP | 2002 152108 | 5/2002 |
| JP | 2003 258770 | 9/2003 |
| JP | 2005 57778 | 3/2005 |
| JP | 2005-092544 | 4/2005 |
| JP | 2006 5908 | 1/2006 |
| JP | 2006 287755 | 10/2006 |
| JP | 2006 287757 | 10/2006 |
| WO | 03 058871 | 7/2003 |
| WO | 2004 038984 | 5/2004 |
| WO | 2004 038985 | 5/2004 |

* cited by examiner

*Primary Examiner* — Ricky Ngo
*Assistant Examiner* — Paul Masur
(74) *Attorney, Agent, or Firm* — Oblon, Spivak, McClelland, Maier & Neustadt, L.L.P.

(57) ABSTRACT

The present invention relates to a wireless communication system that performs data communication using a spatial multiplex transmission scheme. A mobile station includes a transmission weight calculating unit that calculates a transmission weight and a beam information notifying signal generating unit that transmits a known signal for generating partial space information at a base station side. A base station includes a scheduling unit (DL spatial scheduling unit (17), UL spatial scheduling unit (18), and beam information notifying signal response vector estimating unit (20)) that generates the partial space information based on a received first known signal, and performs downstream scheduling and upstream scheduling based on the partial space information, and a scheduling result transmitting unit (UL control information generating unit (14) and transmission weight calculating unit (19)) that transmits a packet including an upstream scheduling result.

36 Claims, 8 Drawing Sheets

| SINR [dB] | Modulation | Coding Rate | Throughput [b/s/Hz] |
|---|---|---|---|
| ~-5.0 | No use | 0 | 0 |
| -5~-1.9 | QPSK | 1/8 | 0.25 |
| -1.9~1.8 | QPSK | 1/4 | 0.5 |
| 1.8~3.8 | QPSK | 1/2 | 1 |
| 3.8~7.1 | QPSK | 2/3 | 1.33 |
| 7.1~9.3 | 16QAM | 1/2 | 2 |
| 9.3~11.3 | 16QAM | 2/3 | 2.67 |
| 11.3~14.5 | 64QAM | 1/2 | 3 |
| 14.5~17.2 | 64QAM | 2/3 | 4 |
| 17.2~19.5 | 64QAM | 4/5 | 4.86 |
| 19.5~ | 64QAM | 7/8 | 5.25 |

Downlink (Scheduling Instruction slot)

Uplink (Data packet)

WIRELESS COMMUNICATION SYSTEM AND COMMUNICATION CONTROL METHOD

TECHNICAL FIELD

The present invention relates to a wireless communication system that spatially multiplexes data series. More particularly, the present invention relates to a wireless communication system in which the base station performs spatial multiplexing between a plurality of mobile stations, and a communication control method when the spatial multiplexing is performed.

BACKGROUND ART

In recent years, a communication system that significantly increases transmission capacity by carrying out spatial multiplex communication using a plurality of antennas, has been gathering attention. A known spatial multiplex communication includes a space division multiple access (SDMA) in which communication is performed simultaneously between a base station (BS) that includes a plurality of antennas and a plurality of mobile terminals (MTs) that includes a single antenna, and a multiple input multiple output (MIMO) in which both the BS and the MT include a plurality of antennas, and communicate by simultaneously using a plurality of spatial channels.

For example, in the following Patent Document 1, a communication device (transmission device) that performs MIMO transmission using orthogonal space (partial space) is disclosed. According to the description of the Patent Document 1, the transmission device is a transmission device of a system that communicates using a spatial division multiplex transmission scheme, and if k directivities can be formed, based on a channel response between each antenna element of the transmission device transmitted from a reception device and each antenna element of the reception device, calculates a plurality of eigenvectors from a matrix of $A_H A$ (superscript "H" is a Hermitian transformation), by using a matrix A with the size of N×M in which the channel response is an element. Then, k eigenvectors are subsequently selected from the large eigenvalue, and by setting the k directivities determined by the selected k eigenvectors as the k directivities, the separation characteristics on the separation of the multiplexed signals is improved.

In the following Patent Document 2, a method of performing spatial multiplex communication between a plurality of BSs and a plurality of MTs is disclosed. According to the description of the Patent Document 2, each BS emits information that includes a beam identification signal (BS number and beam number) using a multi-beam having a narrow beam width. The MT detects a reception level of each beam for each BS, and after forming a level table in which beam numbers equal to or more than a threshold are arranged in the descending order of the reception level, transmits thereof to the corresponding BS. Each BS calculates a degree of interference of each of its own beam from the level table received from each MT, and allocates the beam (beam number) with the least amount of interference among the beams equal to or more than the threshold of the reception level to each MT. Subsequently, the BS transmits the allocated beam number and the amount of interference (information) to the MT. Then, based on the beam number and the amount of interference received from each BS, the MT selects the beam with a small amount of interference, and communicates with the BS allocated with the selected beam. Accordingly, an appropriate base station beam can be acquired by less upstream transmission information, and a mobile communication system that can transmit downstream information at high speed is realized.

Patent document 1: Japanese Patent Application Laid-open No. 2003-258770

Patent document 2: Japanese Patent Application Laid-open No. 2002-152108

DISCLOSURE OF INVENTION

Problem to be Solved by the Invention

When the MTs and BSs that include a plurality of antennas communicate, an enormous amount of control information need to be exchanged in a process of selecting the MT that performs simultaneous communications and in a process of forming an optimal communication path. Subsequently, there is a problem of degrading transmission efficiency.

When the technology disclosed in the Patent Document 2 is used, the control information can be reduced. However, in the technology, the BS transmits a fixed beam with a narrow width, and only one or two fixed beam is transmitted to the MT, which is a communication target, stopping the other beams that cause interference. Accordingly, an improvement can be made to the sacrificed advantages of an adaptive array.

The present invention has been made in view of the above, and intended to obtain a wireless communication system and a communication control method that can realize highly efficient spatial multiplexing with a small amount of control information, without sacrificing the advantages of the adaptive array.

Means for Solving Problem

To solve the above problems and to achieve the object, the present invention provides a wireless communication system including a base station that includes a plurality of antennas and a plurality of mobile stations. The base station performs a data communication with each of the mobile stations by a spatial multiplex transmission scheme using a time division duplex (TDD). Each of the mobile stations includes a transmission weight calculating unit that calculates a transmission weight based on a condition of a transmission path to the base station and a known signal transmitting unit that transmits a first known signal for generating partial space information at the base station side by using the transmission weight. The base station includes a scheduling unit that generates the partial space information with each of the mobile stations based on the first known signal received from the mobile stations, and based on each piece of the partial space information, performs a downstream scheduling for determining destination mobile stations simultaneously receiving data and a transmission beam used for communication in a downlink and an upstream scheduling for determining transmission source mobile stations simultaneously transmitting data and a transmission beam used for communication in an uplink and a scheduling result transmitting unit that transmits a packet including an upstream scheduling result and a second known signal used when the transmission source mobile stations receive the upstream scheduling result. The transmission source mobile stations receive the upstream scheduling result by using a reception weight generated based on the second known signal included in the packet, and transmits data based on the upstream scheduling result.

Effect of the Invention

With the invention, based on a known signal transmitted from each mobile station, for example, the base station can estimate a received SINR at each beam, and can perform spatial scheduling based on the estimation result. Accordingly, conventionally required feedback information (SINR measurement result at the reception side) from the reception side (mobile station) is no longer necessary, thereby advantageously improving the transmission efficiency.

Figure 1:
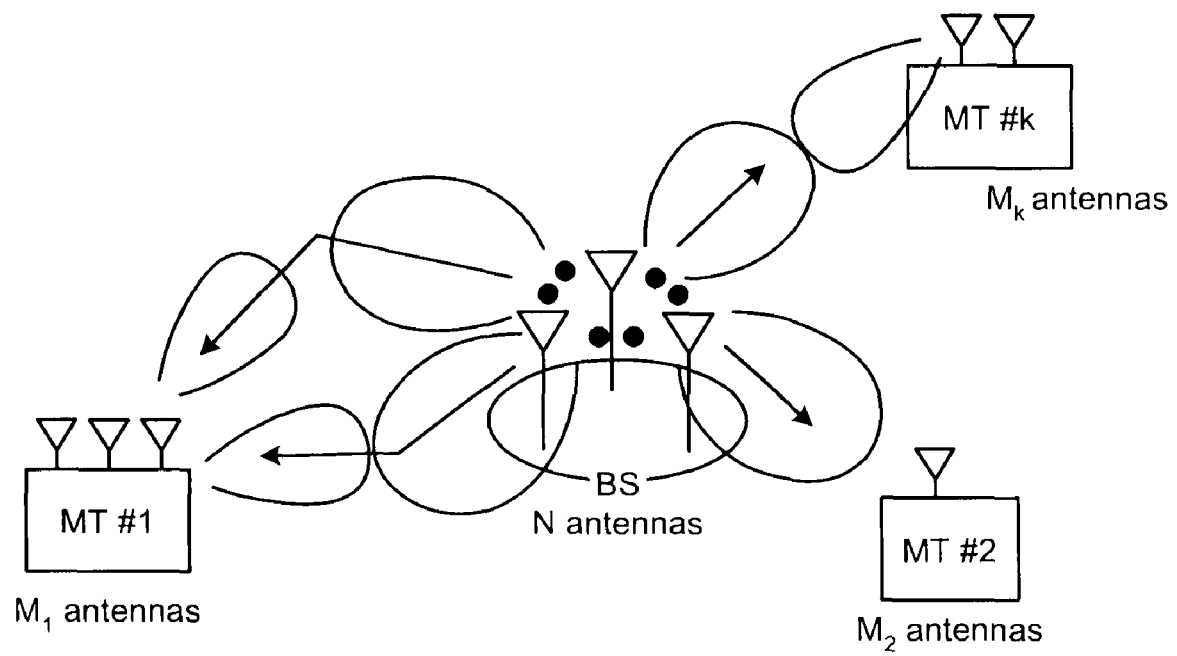
FIG. 1 is a schematic of a structure of a communication system of a first embodiment realized by a wireless communication system and a communication control method according to the present invention.

EXPLANATIONS OF LETTERS OR NUMERALS 1 antenna
2 FFT/IFFT unit
3 weighting combining unit
4 modulator
5 demodulator
6 UL reception controlling unit
7 reception weight calculating unit
8 UL response vector estimating unit
9 Ack transmission weight calculating unit
10 Ack packet generating unit
11 notification information generating unit
12 initial setting unit
13 DL packet generating unit
14 UL control information generating unit
15 power parameter receiving unit
16 transmission weight calculating unit
17 DL spatial scheduling unit
18 UL spatial scheduling unit
19 transmission weight calculating unit
20 beam information notifying signal response vector estimating unit
21 Ack response vector estimating unit
22 Ack reception weight calculating unit
23 Ack confirming unit
24 UL delivery confirming unit
31 antenna
32 FFT/IFFT unit
33 weighting combining unit
34 modulator
35 demodulator
36 reception weight calculating unit
37 DL response vector estimating unit
38 Ack transmission weight calculating unit
39 Ack packet generating unit
40 DL reception controlling unit
41 UL packet generating unit
42 beam information notifying signal generating unit
43 beam information notifying pilot information receiving unit
44 transmission weight calculating unit
45 UL control information analyzing unit
46 transmission path matrix/interference noise matrix estimating unit
47 transmission weight calculating unit
48 UL control information unit response vector estimating unit
49 reception weight calculating unit
50 Ack response vector estimating unit
51 Ack reception weight calculating unit

BEST MODE(S) FOR CARRYING OUT THE INVENTION

Exemplary embodiments of a wireless communication system and a communication control method according to the present invention are described below in greater detail with reference to the accompanying drawings. However, the present invention is not limited by the embodiments.

First Embodiment

The present invention realizes a spatial multiplex transmission system highly efficient with a small amount of control information, by supposedly using a time division duplex (TDD) system that uses the same frequency band for transmission carried out between a base station and a mobile station (mobile terminal). In the following explanations (explanation in the present embodiment and explanations given after a second embodiment), a signal series that includes a series of data structure is referred to as a frame, and a unit of meaningful transmission data (unit that can confirm delivery) is referred to as a packet. One frame includes a plurality of packets, and in spatial multiplex communication, the packets are transmitted at the same time in the same frequency.

FIG. 1 is a schematic of a structure of a wireless communication system according to a first embodiment of the present invention. The wireless communication system includes a base station (hereinafter, "BS") and a plurality of mobile terminals (hereinafter, "MT") that perform spatial multiplex communication with the base station. In FIG. 1, k-th MT (indicated as "MT#k") includes Mk antennas, and communicates with the BS by applying beamforming. The BS includes N antennas, and carries out communication by determining an MT that communicates simultaneously and a beam to be used. In the present invention, an operation by which the BS determines the MT and the beam is referred to as a spatial scheduling.

Figure 2:
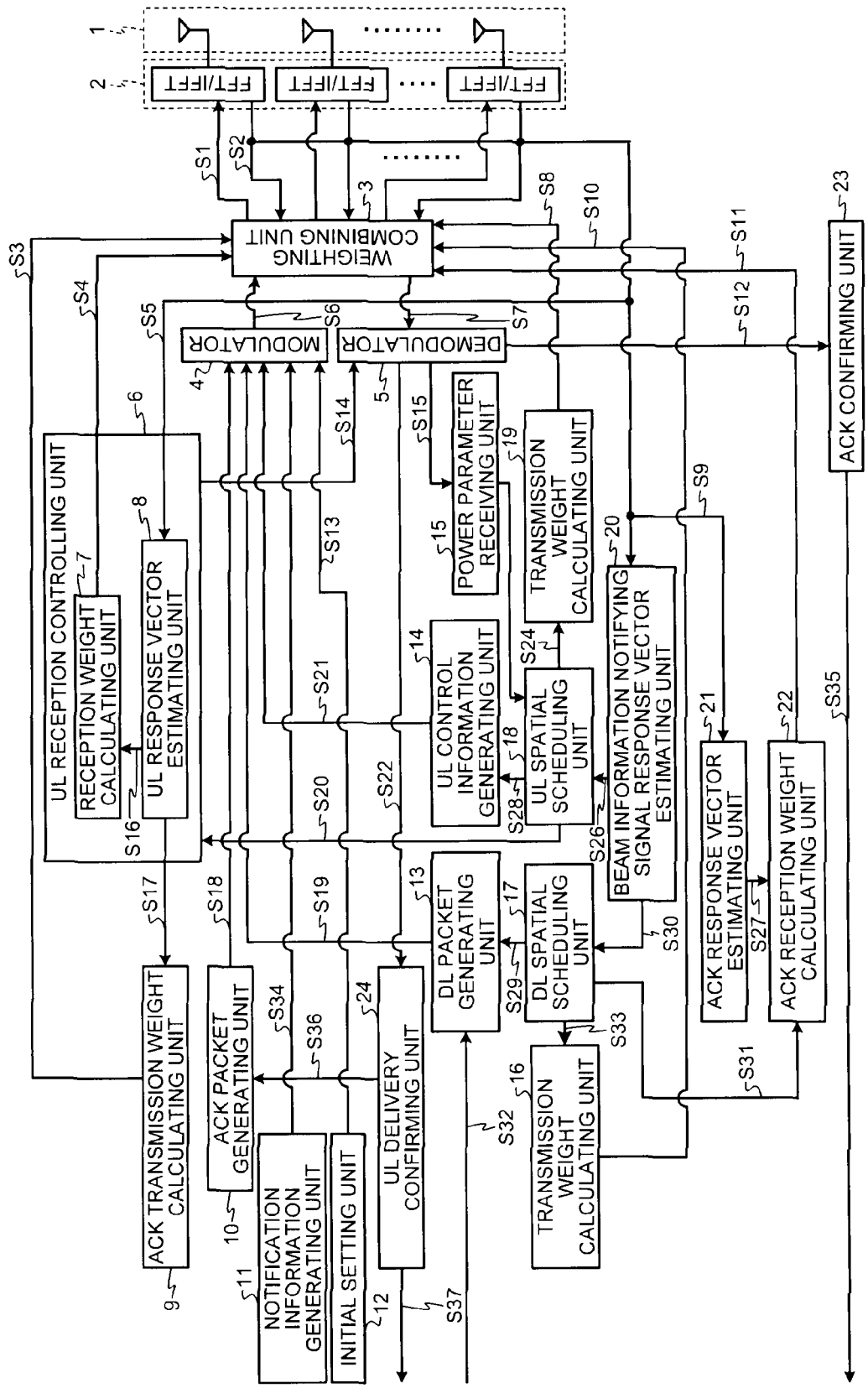
FIG. 2 is a schematic of a structure of a BS according to the first embodiment.

FIG. 2 is a schematic of a structure of the BS according to the first embodiment. The structure of the BS that uses a communication method of an orthogonal frequency division multiplexing (OFDM) will be described.

FIG. 2 includes an antenna 1, an FFT/IFFT unit 2, a weighting combining unit 3, a modulator 4, a demodulator 5, a UL reception controlling unit 6, a reception weight calculating unit 7, a UL response vector estimating unit 8, an Ack transmission weight calculating unit 9, an Ack packet generating unit 10, a notification information generating unit 11, an initial setting unit 12, a DL packet generating unit 13, a UL control information generating unit 14, a power parameter receiving unit 15, a transmission weight calculating unit 16, a DL spatial scheduling unit 17, a UL spatial scheduling unit 18, a transmission weight calculating unit 19, a beam information notifying signal response vector estimating unit 20, an Ack response vector estimating unit 21, an Ack reception weight calculating unit 22, an Ack confirming unit 23, and a UL delivery confirming unit 24. The UL reception controlling unit 6 includes the reception weight calculating unit 7 and the UL response vector estimating unit 8.

A transmission signal S1 of each antenna (transmission signal on frequency axis), a reception signal S2 of each antenna (reception signal on frequency axis), an Ack transmission weight S3, a UL reception weight S4, a UL unit known signal (pilot G) S5, a transmission signal S6 of each channel, a reception signal S7 of each channel, a UL control information transmission weight S8, an Ack unit known signal (pilot B) S9, a DL transmission weight S10, an Ack reception weight S11, an Ack demodulator output S12, an initial setting signal S13, MCS information S14, a power parameter information unit demodulator output S15, UL response vector information S16, UL response vector information S17, Ack transmission information S18, DL transmission information S19, UL scheduling information S20, UL control information S21, a UL reception packet S22, power parameter information S23, UL scheduling information/response vector information S24, a beam information notifying unit known signal (pilot A) S25, a beam information notifying signal unit response vector S26, an Ack unit response vector S27, UL scheduling information S28, DL scheduling information S29, a beam information notifying signal unit response vector S30, DL scheduling information S31, DL transmission data S32, DL scheduling information/response vector information S33, notification information S34, Ack confirmation result S35, UL reception confirmation information S36, and UL reception information S37 are also included therein.

Figure 3:
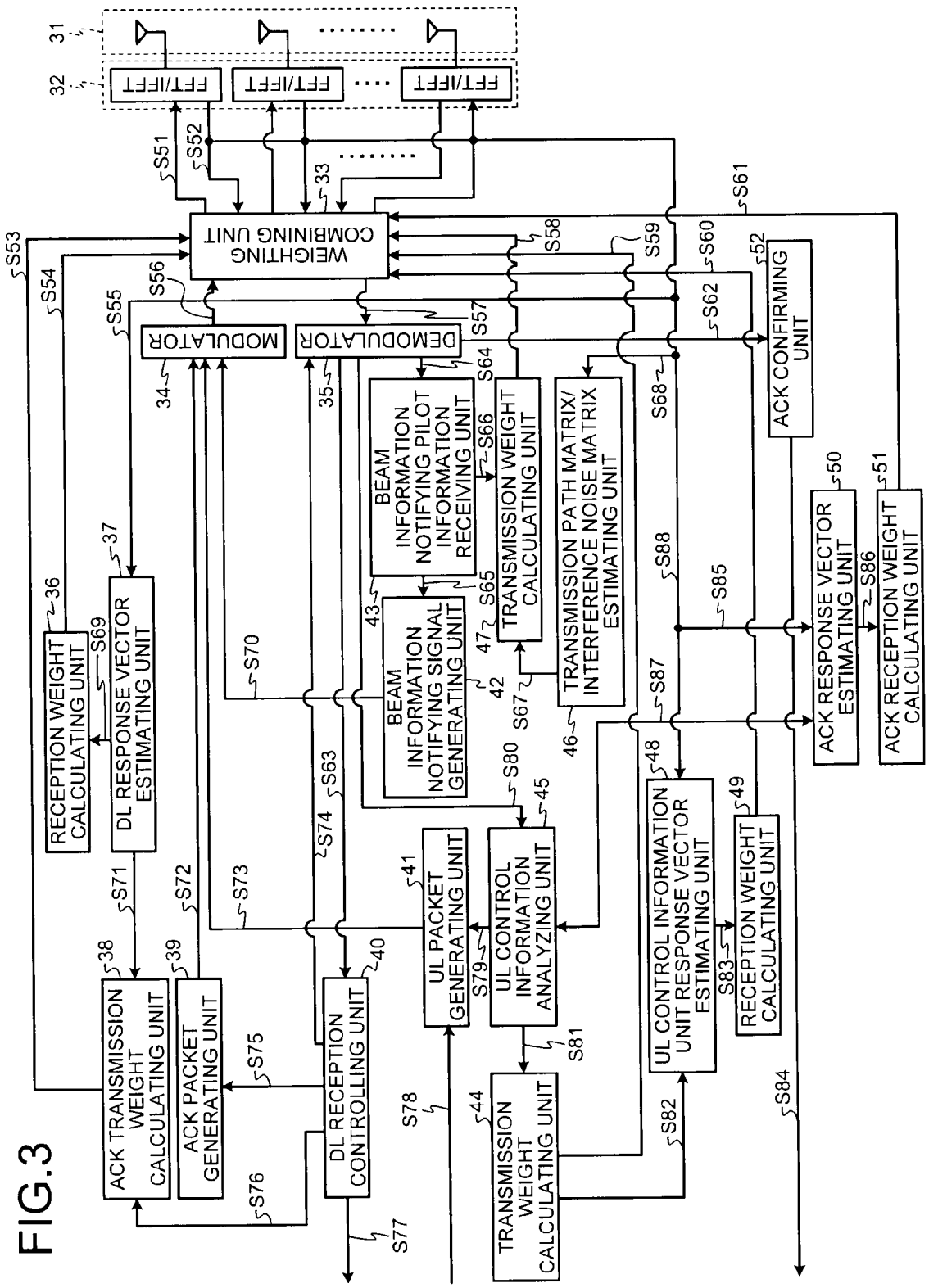
FIG. 3 is a schematic of a structure of an MT according to the first embodiment.

FIG. 3 is a schematic of a structure of the MT according to the first embodiment. FIG. 3 includes an antenna 31, an FFT/IFFT unit 32, a weighting combining unit 33, a modulator 34, a demodulator 35, a reception weight calculating unit 36, a DL response vector estimating unit 37, an Ack transmission weight calculating unit 38, an Ack packet generating unit 39, a DL reception controlling unit 40, a UL packet generating unit 41, a beam information notifying signal generating unit 42, a beam information notifying pilot information receiving unit 43, a transmission weight calculating unit 44, a UL control information analyzing unit 45, a transmission path matrix/interference noise matrix estimating unit 46, a transmission weight calculating unit 47, a UL control information unit response vector estimating unit 48, a reception weight calculating unit 49, an Ack response vector estimating unit 50, and an Ack reception weight calculating unit 51.

A transmission signal (frequency axis) S51 of each antenna, a reception signal (frequency axis) S52 of each antenna, an Ack transmission weight S53, a DL reception weight S54, a DL unit known signal (pilot F) S55, a transmission signal S56 of each channel, a reception signal S57 of each beam, transmission weight information S58, a UL transmission weight S59, a UL control information reception weight S60, an Ack reception weight S61, an Ack demodulator output S62, a DL packet demodulator output S63, a beam information notifying pilot information demodulator output S64, beam information notifying pilot information S65, beam information notifying pilot information S66, transmission path matrix/interference noise matrix information S67, a notification information known signal S68 (pilot C), a DL unit response vector S69, a beam information notifying signal S70, a DL unit response vector S71, an Ack transmission signal S72, a UL transmission signal S73, DL control information S74, DL reception confirmation information S75, DL pilot information S76, DL reception data S77, UL transmission data S78, UL control information S79, a UL control information unit demodulator output S80, UL control information S81, a UL control information unit response vector S82, a UL control information unit response vector S83, Ack information S84, Ack unit known signal (pilot E) S85, an Ack unit response vector S86, Ack pilot information S87, and a UL control information unit known signal (pilot D) S88 are also included therein.

Figure 4:
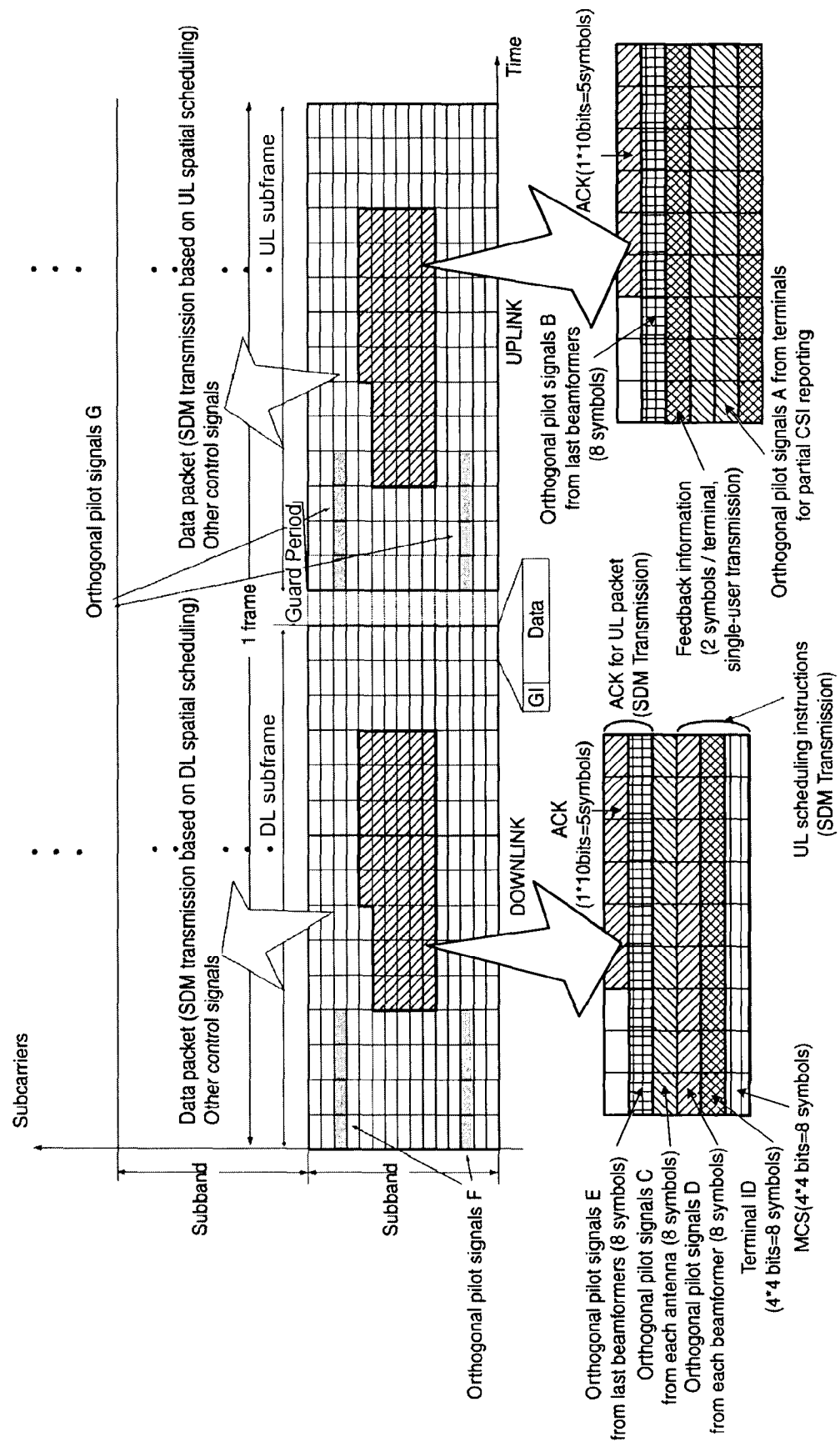
FIG. 4 is a schematic of a structure of a frame used in wireless communication applied with the present invention.

FIG. 4 is a schematic of a structure of a frame used in wireless communication applied with the present invention. The TDD system is used for the communication system of the present embodiment. Accordingly, the frame includes a downlink (DL) subframe and an uplink (UL) subframe.

A first known signal disclosed in the appended claims corresponds to a pilot A (pilot signals A), a second known signal corresponds to a pilot D (pilot signals D), a third known signal corresponds to a pilot F (pilot signals F), a fourth known signal corresponds to a pilot B (pilot signals B), a fifth known signal corresponds to a pilot G (pilot signals G), and a sixth known signal corresponds to a pilot E (pilot signals E).

An operation of spatial multiplexing carried out between the BS and the MT formed as the above will now be explained with reference to FIGS. 2 to 4. The BS and the MT according to the present embodiment perform spatial multiplexing by executing each process of "initial setting (step #1)", "analyzing transmission path and interference state (step #2)", "notifying beam information from the MT to the BS (step #3)", "spatial scheduling in the BS (step #4)", "downlink (DL) transmission (step #5A)", "uplink (UL) control information transmission (step #5B)", "Ack response with respect to DL (step #6A)", "UL transmission (step #6B)", and "Ack response with respect to UL (step #7)", which will be described later.

The operation steps with the same numbers (such as steps #5A and 5B) are executed simultaneously. However, they do not need to be executed simultaneously. Each operation process is the minimum required for realizing the present invention, and the other process may be executed between the steps and the like as required. The detailed operation of each process (step) will now be explained.

(Step #1) Initial Setting

Each MT (MT#1, MT#2, . . . , MT#k) begins the initial entry process in normal mode (non-spatial scheduling mode), and allocated with pilot information (such as the number $m_k$ of pilots and the patterns $r_m(p)$ thereof) and the like for time/frequency synchronization, and for notifying terminal's ID and beam information.

More specifically, each MT receives beacon information and the like transmitted from the BS, and determines the BS to communicate with. The MT then transmits an entry request with respect to the BS to communicate with. The normal communication, without performing beam control and the like, is carried out here. However, the entry may be performed by using a specific fixed beam. Details of the process related to the entry request is not specified, but the initial setting unit 12 of the BS indicates time/frequency synchronization, assigns terminal's ID, and allocates pilot signals used for notifying beam information, and generates an initial setting signal S13. The initial setting signal S13 is then transmitted towards the MT, via the modulator 4 and the like. A known signal information notifying unit includes the modulator 4 and the initial setting unit 12.

Each MT receives an indication signal (signal that includes information on time/frequency synchronization, terminal's ID, and information on allocated pilot signals (the number $m_k$ of pilots and the patterns $r_m(p)$ thereof)) from the BS, and carries out the corresponding operation (such as time synchronization/frequency synchronization). The beam information notifying pilot allocating information S64 (information on allocated pilot signals) included in the indication signal from the BS is received by the beam information notifying pilot information receiving unit 43 and stored therein. The allocated number of pilot signals need not be the same in all the MTs, and the BS determines the number based on information such as the number of antennas included in each MT.

(Step #2) Analyzing Transmission Path and Interference State

Each MT measures a downstream transmission path and an interference state. To do so, the BS transmits an identifiable known signal (pilot C, see FIG. 4) to each antenna, as notification information, in a downlink from the BS to the MTs. More specifically, the BS generates notification information S34 at the notification information generating unit 11. The notification information S34 includes the pilot C of which the MT uses to measure each transmission path between the antennas of the BS and the MTs. If the pilot C is a signal orthogonal between the antennas, it is possible to efficiently estimate the transmission path.

The generated notification information S34 becomes a complex baseband signal S6 after being modulated by the modulator 4, and transmitted to the FFT/IFFT unit 2 connected to each antenna, via the weighting combining unit 3 that realizes beamforming. The FFT/IFFT unit 2 converts the baseband signal S2 on the frequency axis received from the weighting combining unit 3 to a signal on a time axis, and adds a guard interval. The signal added with the guard interval is transmitted from the antenna 1. The notification information, according to its nature, is often transmitted in omni-direction. If transmitted in omni-direction, the output signal of the modulator 4 is transmitted in omni-direction from a single antenna, without going through the beamforming process performed at the weighting combining unit 3.

Each MT receives the notification information transmitted from the BS by the antenna 31. The reception signal from which the guard interval is removed, is converted into a reception signal S52 on the frequency axis from the signal on the time axis at the FFT/IFFT unit 32. The transmission path matrix/interference noise matrix estimating unit 46 extracts the notification information known signal S68 (pilot C) included in a notifying signal, estimates a transmission path between the BS and the MT, and generates a transmission path matrix. The interference state of the own terminal is also observed, and an interference noise correlation matrix is generated. In general, a long observation period is required for generating the interference noise correlation matrix, compared with generating the transmission path matrix. Subsequently, there is no need to perform these processes at the same time.

An operation of generating a transmission path matrix $H_k$ and an interference noise correlation matrix $R_{IN}(k)$ will be explained by using MT#k, which is the k-th MT. Among a plurality of methods to calculate these matrices, only one example is shown here. The transmission path matrix and the interference noise correlation matrix between each of the MTs and the BS are determined, by executing the similar calculation in all the MTs. Accordingly, an MT number k used to identify the MT will be omitted.

A transmission path matrix H is expressed by Equation (1), if a complex propagation coefficient for the m-th antenna (antenna #m) of the MT from the n-th antenna (antenna #n) of the BS is $h_{mn}$. The complex propagation coefficient $h_{mn}$ can be measured at the side of the MT, by transmitting a known signal (such as a Walsh code) orthogonal from each of the antennas of the BS. In Equation (1), N indicates the number of antennas of the BS, and M indicates the number of antennas of the MT.

[Numerical expression 1]

$$H = \begin{bmatrix} h_{11} & h_{12} & \cdots & h_{1N} \\ h_{21} & \ddots & & \vdots \\ \vdots & & \ddots & \vdots \\ h_{M1} & \cdots & \cdots & h_{MN} \end{bmatrix} \quad (1)$$

The interference noise correlation matrix $R_{IN}$ can be expressed by a time average value of an interference noise vector $Z_{IN}$. If a reception signal of the antenna #m of the MT without having a signal from the target BS is $z_m$, the interference noise vector $Z_{IN}$ is expressed by Equation (2).

[Numerical expression 2]

$$Z_{IN} = \begin{bmatrix} z_1 \\ \vdots \\ z_M \end{bmatrix} \quad (2)$$

Accordingly, if the interference noise vector at the time p is expressed by $Z_{IN}(p)$, and the time average is expressed by an expectation value of $E[\cdot]$, $R_{IN}$ is expressed by Equation (3).

$$R_{IN}=E[Z_{IN}(p)Z_{IN}^{+}(p)] \quad (3)$$

In Equation (3), a superscript "+" indicates conjugate transpose. If there is no interference in the MT#k, $R_{IN}(k)$ becomes a diagonal matrix, and is expressed as $R_{IN}(k)=P_{kz}I$. $P_{kz}$ is a noise power, and I is a unit matrix of the size $M_k$ (the number of antennas of k-th MT).

(Step #3) Notifying Beam Information from MT to BS

Each MT determines a transmission beam weight $v_k$ to be used by the own terminal, by using the transmission path matrix $H_k$ and the interference noise correlation matrix $R_{IN}(k)$. More specifically, the transmission weight calculating unit 47 acquires information (the number $m_k$ of pilots and the patterns $r_m(p)$ thereof) stored in the beam information notifying pilot information receiving unit 43 at step #1, as beam information notifying pilot information S66. The transmission weight calculating unit 47 then selects and determines as much as $m_k$ (the number of pilot signals allocated at step #1) of the transmission weight $v_k$ in good condition, based on the acquired beam information notifying pilot information S66.

An evaluation function that corresponds to each system is used for selecting and determining $v_k$. Although the present invention does not limit the specific method, one example is shown here. A method of determining $v_k$, by carrying out a singular value decomposition between the BS and the MT will now be explained.

In the TDD system in which the reciprocity of the propagation path is satisfied, the transmission path in an upstream direction (to BS from MT#k) can be expressed as $H_k T$ (T is transposed), if the transmission path matrix in a downstream direction generated by the MT#k is $H_k$. The singular value decomposition shown in Equation (4) is performed, by using a noise power $P_{kz}$ at the MT#k.

[Numerical expression 3]

$$\frac{H_k^T}{\sqrt{P_{kz}}} = U\Lambda Q^+ \quad (4)$$

In Equation (4), U represents a unitary matrix of N×N, $Q=[q_1, \ldots, q_{Mk}]$ represents a unitary matrix of M×$M_k$, and $\Lambda=\text{diag}[\lambda_1, \ldots, \lambda_d]$ represent a real diagonal matrix of N×$M_k$. N represents the number of antennas of the BS, $M_k$ represents the number of antennas of MT#k, and d represents min(N, $M_k$).

The MT#k uses $v_k=q_m$ as a transmission beam weight, and transmits the allocated pilot signals $r_1(p), \ldots, r_{mk}(p)$ by the respective beams (transmits pilot A). At this time, $m_k$ (corresponds to the number of allocated pilot signals) beams in good condition are selected from $M_k$ beams. The MT#k controls the transmission power, so as the average of the signal power, of which all the $m_k$ beams to the BS are added, becomes a fixed value of $P_0$ on the reception of the BS. Similarly, with all the other MTs, the transmission power control is carried out, so as the average of the signal power added on the reception of the BS becomes $P_0$.

Each of MT feedbacks a power parameter η using the best beam, along with the transmission of the pilot signals. The power parameter η is a parameter of which the BS uses for measuring a received signal-to-interference-plus-noise-ratio (SINR) of each MT. Instead of using the best beam, it is also possible to disperse (map) information on a plurality of beams, as the transmission of the pilot A.

More specifically, the beam information notifying signal generating unit 42 acquires information (the number $m_k$ of pilots and the patterns $r_m(p)$ thereof) stored in the beam information notifying pilot information receiving unit 43 at step #1, as beam information notifying pilot information S65. Then, based on the acquired beam information notifying pilot information S65, a beam information notifying signal S70 that includes the power parameter η is generated, using the allocated pilot pattern (pattern of pilot A), and the modulator 34 converts the beam information notifying signal S70 to a complex baseband signal S56. The weighting combining unit 33 forms a transmission beam based on the transmission weight information S58, and transmits a beam information notifying signal from each antenna. The signal, if the allocated pilot signals (pilot A) is an orthogonal pattern (when each pattern $r_m(p)$ is orthogonal to each other), a plurality of MTs or a plurality of beams can be transmitted at the same time in the same frequency. A known signal transmitting unit includes the weighting combining unit 33, the modulator 34, and the beam information notifying signal generating unit 42.

The BS measures the response of the pilot signal (pilot A) by each antenna, performs signal combining or phase correction between the antennas of the transmission information, based on the response of the propagation path, and receives the power parameter η. More specifically, the power parameter receiving unit 15 extracts the power parameter η from the demodulation result (demodulation signal) of the demodulator 5, as a power parameter information unit demodulator output S15, and stores therein the extracted power parameter.

If the MT and the BS both only have one antenna, in the present method, the control information is transmitted with a channel notifying pilot signal, and the BS performs phase correction and receives the control information, from the response of the pilot signal. Accordingly, the present method is effective even if the BS and the MT only have one antenna.

An example is shown in the above. However, the transmission beam $v_k$ may also use an omni-directional beam of which the MT selected one antenna, by setting the weight of only one antenna to 1, and setting the weight of the other antennas to 0. The transmission beam $v_k$ may also control the beam direction so as to be different from the direction where the interference to the MT comes from, by using the interference noise correlation matrix $R_{IN}(k)$.

A feedback method of the power parameter η in the present invention was described above. However, the other controls shown in the present invention can be operated, by using the other information feedback method in general. The timing and the cycle to feedback the power parameter η may be different from the transmission of the pilot signal.

(Step #4) Spatial Scheduling in BS

In the BS, partial channel information of each MT can be acquired, by receiving the beam information notification from each of the MTs. Based on the information, the BS performs spatial scheduling, and allocates resources in the uplink and the downlink. In the downlink, a transmission weight, a reception terminal (receiving MT), a modulation and coding set (hereinafter, "MCS"), and a transmission power are determined for each beam. In the uplink, a transmission terminal (transmitting MT), a transmission weight of a transmission beam, an MCS, and a transmission power are determined. As described above, the BS does not necessarily need to obtain all the transmission paths between the BS and the MTs. The spatial scheduling can be performed, if there is partial channel information.

Because the spatial scheduling is executed by using various evaluation functions that depend on the system, it is not defined here. Basically, the combination of the weight, the MCS, and the like may be determined, so as the system throughput is increased in line with the available MCS, by evaluating the received SINR at the MT while using each beam (SINR of each beam changes according to the combination of the beams to be used).

A specific example of a spatial scheduling operation will be described. The BS that received the beam notification information from each MT, converts the beam notification information into a signal on a frequency axis in the FFT/IFFT unit 2, and extracts a known signal S25 (pilot A) included therein. At the beam information notifying signal response vector estimating unit 20 of the BS, a response vector (beam information notifying signal unit response vectors S26 and S30) of each beam is calculated from the information in the known signal S25 received by each antenna. The BS can recognize partial space information (partial channel information) included between each MT and the BS, from the calculated response vector. Each scheduling unit (DL spatial scheduling unit 17 and UL spatial scheduling unit 18) selects a beam to communicate with and an MCS of each of the beams, based on the partial space information and the traffic state between each of the MTs. Because the signal quality (such as SINR) of each beam differs by the combination of beams that performs spatial division multiplex communication, the scheduling is carried out by taking into account the combination of beams and evaluating the signal quality. The SINR of each beam is calculated, by using the power parameter information S23 notified in advance from each MT. In general, because the traffic in the UL and the DL generates differently, each scheduling unit correspondingly selects the combination of different beams. A scheduling unit includes the DL spatial scheduling unit 17, the UL spatial scheduling unit 18, and the beam information notifying signal response vector estimating unit 20.

The BS also determines a DL transmission beam weight that corresponds to the spatial scheduling result (determined combination). Because there are various methods to determine the weight depending on the nature of the system, it is not defined here. However, for example, there is a beamforming based on a Zero-Forcing criterion. This is a method to control the beam so as the interference between partial channels of each MT that communicates simultaneously becomes 0. A specific example of how to determine the weight is explained at step #5B, which will be described later.

(Step #5A) Downlink (DL) Transmission

Figure 5:
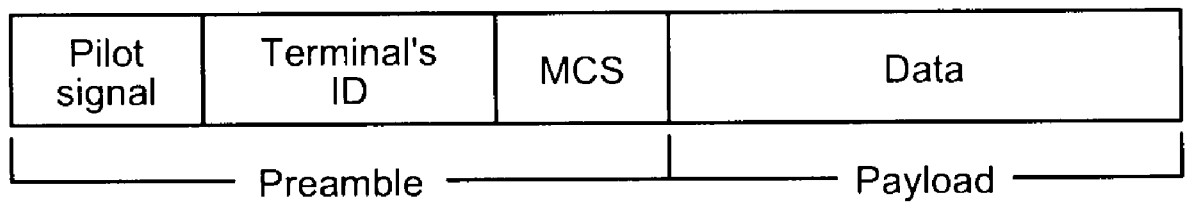
FIG. 5 is a schematic of a structure of a packet transmitted from the BS to each MT.

The BS, based on the determination of the DL spatial scheduling unit 17 at step #4, builds a packet that includes pilot signals (pilot F), terminal's ID, and MCS information (see FIGS. 4 and 5), and performs spatial multiplexing using the transmission beam determined at step #4. FIG. 5 is a schematic of a structure of a packet transmitted from the BS to each MT. The packet allocates pilot signals, terminal's ID, and an MCS to a preamble unit, and allocates data to a payload unit. The terminal's ID of the preamble unit is an ID that indicates a destination terminal (MT) of the packet, and the MCS is information used for receiving (demodulating and decoding) the payload unit.

Each MT receives the packet by determining an optimal reception beam weight (such as a weight that maximizes the SINR) from the pilot signals (pilot F) inserted into the reception signal. Then, each MT checks the terminal's ID (of the preamble unit) included in the packet, and if the packet is addressed to the own terminal (if the terminal's ID in the packet coincides with the own terminal's ID), the demodulating and the decoding are carried out by using the received MCS information. On the other hand, if the packet is addressed to the other terminal, no action will be taken. The details of the operations of the BS and each MT will now be explained.

At the BS, based on the DL scheduling information S29 and the transmission data S32 determined at the DL spatial scheduling unit 17, the DL packet generating unit 13 generates DL transmission information S19 of each beam. The modulator 4 converts the DL transmission information S19 to a complex baseband signal (transmission signal) S6. The transmission data (transmission signal S6) includes pilot signals (pilot F), terminal's ID (of the destination), and MCS information. At the same time, the transmission weight calculating unit 16 calculates a transmission weight (DL transmission weight S10) of each beam, from the DL scheduling information S33 determined in the DL spatial scheduling unit 17. In the S33, information that corresponds to the response vector information S30 of the beam information notifying signal S70 is also included, as well as the scheduling information. Accordingly, it is possible to calculate the weight of each beam, based on the Zero-Forcing criterion, which is already described, and the like. At the weighting combining unit 3, the baseband signal S6 is weighted based on the DL transmission weight S10, and transmitted from each antenna, after the frequency is converted to a time signal by the FFT/IFFT unit 2. A DL data packet transmitting unit includes the weighting combining unit 3, the modulator 4, the DL packet generating unit 13, and the transmission weight calculating unit 16.

At each MT, a DL unit known signal (pilot F) S55 is extracted from the reception signal S52 on the frequency axis output from the FFT. At the DL response vector estimating unit 37, a response vector of each pilot signal is estimated. At the reception weight calculating unit 36, based on the DL unit response vector information S69 that is the estimation result of the response vector in the DL response vector estimating unit 37, the optimal reception weight (DL reception weight S54) to receive each beam is calculated. The calculation is carried out by using a general method such as an algorithm based on SINR maximization. Although not shown in the block diagram shown in FIG. 3, an interference nose matrix estimated at the transmission path matrix/interference noise matrix estimating unit 46 may be used to calculate the reception weight.

The weighting combining unit 33, based on the calculated DL reception weight S54, weights and combines the reception beams. In the reception signal S57 of each beam after being combined, the terminal's ID of the destination and the MCS information are included as described above. The DL reception controlling unit 40 acquires a control information portion (terminal's ID and MCS information) from the demodulator 35 (extracted from DL packet demodulator output S63), and confirms whether the data (packet) is addressed to the own terminal. If the data is addressed to the own terminal, the DL reception controlling unit 40 notifies the acquired MCS information to the demodulator 35, as DL control information S74. The demodulator 35 demodulates the data portion, using a modulation/coding scheme indicated in the MCS information notified from the DL reception controlling unit 40. On the reception of the demodulator output S63 acquired by demodulating the data portion, the DL reception controlling unit 40 generates DL reception data S77, after confirming the delivery.

(Step #5B) Uplink (UL) Control Information Transmission

By using a control region (corresponds to "UL scheduling instructions" region shown in FIG. 4) in the DL frame, the BS builds N pieces of uplink scheduling notification information that includes pilot signals (pilot D), terminal's ID, a beam number, MCS information, and transmission power information, based on the determination made by the UL spatial scheduling unit 18. More specifically, the UL control information generating unit 14 generates UL control information S21 that is the uplink scheduling notification information, based on the UL scheduling information S28 that shows the spatial scheduling result determined by the UL spatial scheduling unit 18 at step #4. The BS generates the UL control information S21 for each beam. As described above, each of the generated pieces of the UL control information S21 includes pilot signals (pilot D), terminal's ID of the MT that uses the beam, and each piece of information on the MCS used for the UL transmission. If the number $n_{max}$ of spatially multiplexed data packets transmitted in the uplink is equal to or less N piece, the terminal's ID included in a part of the UL control information S21 is expressed by a value indicating unused.

The BS then spatially multiplexes the generated uplink scheduling notification information. More specifically, the transmission weight calculating unit 19 of the BS calculates a UL control information transmission weight S8, based on the UL scheduling information/response vector information S24 received from the UL spatial scheduling unit 18. The UL control information S21, after being modulated by the modulator 4, goes through a weighted process based on the UL control information transmission weight S8 at the weighting combining unit 3, and spatially multiplexed from each antenna. A scheduling result transmitting unit includes the weighting combining unit 3, the modulator 4, the UL control information generating unit 14, and the transmission weight calculating unit 19.

Transmission weights $w_1 DL, \ldots, w_N^{DL}$ used for spatially multiplexing the UL control information S21 is determined by Equation (5).

[Numerical expression 4]

$$[w_1^{DL}, \ldots, w_n^{DL}] = N^{1/2} \frac{(B^* B^T)^{-1} B^*}{tr\{(\hat{B}^* \hat{B}^T)^{-1}\}^{1/2}} \quad (5)$$

$$B = [b_1 l\|b_1\|, \ldots, b_N l\|b_N\|]$$

Here, $b_1, \ldots, b_N$ is a response vector ($b_n = H_k T q_m$) acquired from the pilot signal notified from each MT at step #3, and corresponds to the MT and the response vector of the beam selected by the UL packet transmission at step #4. If the number $n_{max}$ of spatially multiplexed data packets transmitted in the uplink is equal to or less than N piece, "$b_{nmax+1}, \ldots, b_N$" is selected as a first-order linear vector, with respect to "$b_1, \ldots, b_{nmax}$".

Using the similar procedure to step #5A, each MT receives uplink scheduling notification information. In other words, each MT receives the uplink scheduling notification information by forming an optimal reception beam, using pilot signals (pilot D) inserted into the uplink scheduling notification information. Each MT then confirms the terminal's ID included in the received uplink scheduling notification information, and if the terminal's ID coincides with the own terminal's ID, confirms and stores therein each pieces of information of the MCS, the transmission power, and the pilot pattern, included in the uplink scheduling notification information. To transmit an upstream packet (UL packet), the information stored therein will be used (performs transmission based on the stored information).

A specific operation of each unit of the MT, on the reception of the uplink scheduling notification information, will be described. At each of the MTs, the UL control information unit response vector estimating unit 48 extracts a UL control information unit known signal (pilot D) S88 from the FFT output S52 from the FFT/IFFT unit 32, and estimates a response vector of each beam. Then, based on the UL control information unit response vector S83 that shows the estimation result at the UL control information unit response vector estimating unit 48, the reception weight calculating unit 49 calculates a reception weight (UL control information reception weight S60) appropriate for receiving the UL control information included in the uplink scheduling notification information. A criterion such as SINR maximization is used for the calculation. The weighting combining unit 33 then combines outputs of each antenna based on the UL control information reception weight S60, and acquires a UL control information unit demodulator output S80 that is UL control information demodulated via the demodulator 35. The UL control information analyzing unit 45 confirms the information included in the UL control information unit demodulator output S80, extracts the beam and the MCS information used by the own terminal on the transmission in the uplink, and generates the pieces of UL control information S79 and S81.

Each MT also calculates a transmission weight $v_{UL,k}$ of the own terminal. There are various methods to calculate the transmission weight $v_{UL,k}$ of the own terminal. For example, there is a method of using a beam, by referring to the beam number included in the uplink scheduling notification information used at step 3. There is another calculation method that uses pilot signals included in the uplink scheduling notification information. For example, a response vector $a_{n|k}$ in the MT#k of the n-th notification information is calculated from a pilot signal unit, and the transmission weight $v_{UL,k}$ is calculated using Equation (6).

[Numerical expression 5]

$$v_{UL,k} = \frac{(A_k^* A_k^T)^+ a_{k|k}^*}{\|(A_k^* A_k^T)^+ a_{k|k}^*\|} \quad (6)$$

$$A_k = [a_{1|k}, \ldots, a_{N|k}]$$

Superscripts "+", "*", and "T" in Equation (6) respectively indicates Moore-Penrose generalized inverse matrix, complex conjugate, and transpose. $A_k$ and $a_{k|k}$ are a response vector in the MT#k, and can be measured directly.

An example is described here. However, if the MT calculates $v_{UL,k}$ from the pilot signal, the uplink scheduling notification information does not need to include the beam number information. If the MT transmits a signal at a constant transmission power or autonomously controls the transmission power using the downlink pilot signal, the uplink scheduling notification information does not need to include the transmission power information. If the MT uses a predetermined MCS, the uplink scheduling notification information does not need to include the MCS information. If a predetermined MT transmits in the uplink, the uplink scheduling notification information does not need to include the terminal's ID information.

(Step #6A) Ack Response with Respect to DL

Each MT returns an Ack to the BS, corresponding to the DL packet (data packet used for transmitting downstream user data) received at step #5A. An Ack packet includes pilot signals (pilot B) and Ack information, and transmitted by forming a transmission beam. The MT that simultaneously received the spatially multiplexed packets in the DL, simultaneously transmits an Ack in a UL subframe using spatial multiplexing. Using the similar procedure to step #5B, the MT calculates a response vector from the pilot F included in the DL packet, and calculates a transmission beam weight used for an Ack response.

A specific operation performed at each MT will now be explained. The DL reception controlling unit 40 confirms the delivery of the received DL packet, and generates DL reception confirmation information S75 and DL pilot information S76. The Ack packet generating unit 39, based on the DL reception confirmation information S75, generates an Ack transmission signal S72 that includes pilot signals (pilot B), a frame number, and delivery confirmation information. At the same time, the Ack transmission weight calculating unit 38 calculates an Ack transmission weight S53, using the DL unit response vector S71 and the DL pilot information S76 (information that indicates on which beam the DL packet addressed to the own terminal is mounted). The Ack transmission signal S72 goes through the weighting process based on the Ack transmission weight S53 at the weighting combining unit 33, via the modulator 34, and transmitted from each antenna, by using a defined position ("ACK" region in the UL subframe shown in FIG. 4) in the UL subframe. At the same time (in the same DL subframe), the MT that received the DL packet is controlled so as the Ack is simultaneously transmitted. An upstream Ack transmitting unit includes the weighting combining unit 33, the modulator 34, the Ack transmission weight calculating unit 38, the Ack packet generating unit 39, and the DL reception controlling unit 40.

The BS forms a reception beam by using the pilot B, and receives an Ack packet from each MT. More specifically, the Ack response vector estimating unit 21 that extracted an Ack unit known signal (pilot B) S9 from the FFT/IFFT unit output S2 of the BS estimates a response vector (Ack unit response vector S27) of each Ack packet. The Ack reception weight calculating unit 22, based on the Ack unit response vector S27, generates a reception weight (Ack reception weight S11) of each Ack packet. The BS can recognize from which MT the Ack is transmitted, using the DL scheduling information S31. The weighting combining unit 3 weights and combines reception beams, based on the Ack reception weight S11, and acquires an Ack packet signal mounted on each beam. The signal is demodulated to be the Ack demodulator output S12, and sent to an upper level scheduler as the Ack confirmation result S35, after the delivery is confirmed at the Ack confirming unit 23.

The other control information such as a frame number may also be included in the Ack packet. In this case, the DL scheduling information may be unnecessary. The Ack is returned and transmitted at the UL timing next to a DL packet reception frame, or at the UL timing after a specified value (may be variable if the value is set in advance and shared in all the MTs and the BS) is framed.

It is preferable that the pilot B included in the Ack packet correspond one-to-one with the pilot F used for the data addressed to the own terminal in the DL. If the pilot B does not correspond one-to-one, a pilot pattern to be used in the Ack packet is indicated in the DL packet.

(Step #6B) UL Transmission

Each MT, based on the transmission beam (transmission beam number), the MCS information, and the transmission power information assigned at step #5B, spatially multiplexes the data packet (UL packet used for transmitting upstream user data) in the uplink. At this time, the pilot information (pilot G) is transmitted included in the UL packet. The power at the transmission is the same as the average transmission power per one beam, as that when the partial channel information is notified (when pilot A is transmitted) at step #3. Or, corresponding to the transmission power information (referred to as "a"), the power at the transmission is a[dB] times to the average transmission power per one beam, when the partial channel information is notified at step #3.

The details of the operation at each MT will now be explained. The UL packet generating unit 41 generates a UL transmission signal S73, based on the UL transmission data S78 and the UL control information S79. The UL transmission signal S73 includes the pilot information (pilot G). At the same time, the transmission weight calculating unit 44 calculates a transmission weight (UL transmission weight S59) used when the UL packet is transmitted, based on the UL control information unit response vector S83 and the UL control information S81. The weighting combining unit 33 weights the UL transmission signal after being modulated, based on the UL transmission weight S59, and transmits the UL packet from each antenna, via the FFT/IFFT unit 32. A UL data packet transmitting unit includes the weighting combining unit 33, the modulator 34, the UL packet generating unit 41, the transmission weight calculating unit 44, and the UL control information analyzing unit 45.

The BS forms a reception beam by using the pilot G included in the UL packet, and receives individual UL packet. Because the BS recognizes the MCS information of the MT that uses each beam and the data mounted thereon, the terminal's ID and the MCS information are not necessarily included in the UL packet.

A receiving operation the UL packet in the BS will now be explained in detail. A UL unit known signal (pilot G) S5 is extracted from the signal S2 after the FFT is performed, and the UL response vector estimating unit 8 estimates a response vector of each beam. The reception weight calculating unit 7, by using the UL response vector information S16 that is the estimation result of the UL response vector estimating unit 8, calculates a UL reception weight S4 required for receiving each beam. The weighting combining unit 3 divides each beam into the reception signal S7 of each channel, by weighting and combining based on the UL reception weight S4, and the demodulator 5 obtains the UL reception packet S22 by demodulating the signal S7. Because the BS already knows which MT will transmit information on which beam, the UL reception controlling unit 6 acquires the stored information from the UL spatial scheduling unit 18 in which the information is stored therein, as the UL spatial scheduling information S20. The UL reception controlling unit 6 notifies the MCS information S14 that combined the UL reception weight S4 and the UL spatial scheduling information S20 calculated by the reception weight calculating unit 7 included therein, to the demodulator 5. The demodulator 5, based on the acquired MCS information S14, demodulates the reception signal S7 of each channel received subsequently. The UL delivery confirming unit 24 confirms the delivery of the UL reception packet S22, generates the UL reception confirmation information S36, and generates the finalized UL reception information S37.

It is preferable that the pilot G included in the UL packet correspond one-to-one with the pilot D used for allocating the beam addressed to the own terminal. In the other event, a pilot pattern to be used for the UL packet is assigned in the control information.

To prevent the UL packet from including the terminal's ID and the MIC information, the BS stores therein the uplink scheduling notification information notified at step #5B. If the patterns of the pilot G included in the UL packet and the pattern of the pilot D used at step #5B correspond one-to-one, from the correspondence between the pattern of the pilot G in the UL packet and the uplink scheduling notification information stored in the BS, the terminal's ID and the MCS information in the UL packet can be acquired. The present control may be carried out by using an identification number of the scheduling information, instead of using the pilot signal pattern.

(Step #7) Ack Response to UL

The BC that received the UL packet returns Ack to the corresponding MT. The Ack packet includes pilot signals (pilot E) and Ack information, and transmitted by forming a transmission beam. With respect to the MT that simultaneously transmits the packets spatially multiplexed in the UL, the BS simultaneously transmits Ack in the DL frame using spatial multiplexing. At this time, the BS calculates a response vector from the pilot G included in the UL packet, and calculates a transmission beam weight required for the Ack response. As an example, the transmission beam weight of the Ack is determined as a Zero-Forcing weight or an MMSE weight calculated with respect to a desired packet, based on the pilot G included in the UL packet.

A specific operation performed at the BS will now be explained. The Ack packet generating unit 10 generates Ack transmission information S18, based on the UL reception confirmation information S36. The Ack transmission information S18 includes known pilot signals (pilot E) and Ack information. The Ack transmission information S18 may be generated by including the other control information such as a frame number. At the same time, the Ack transmission weight calculating unit 9 calculates an Ack transmission weight S3 directed at each MT, based on the UL response vector information S17. After the Ack transmission signal S18 directed at each MT is being modulated, the Ack transmission signal S18 is weighted based on the Ack transmission weight S3 in the weighting combining unit 3, and is transmitted from each antenna via the FFT/IFFT unit 2. A downstream Ack transmitting unit includes the weighting combining unit 3, the modulator 4, the Ack transmission weight calculating unit 9, and the Ack packet generating unit 10.

Each MT forms a reception beam by using the pilot E included in the Ack packet, and receives an Ack packet from the BS. More specifically, in each MT, the Ack response vector estimating unit 50 that extracted the Ack unit known signal (pilot E) S85 from the FFT/IFFT unit output S52 estimates a response vector (Ack unit response vector S86) of each beam. The Ack reception weight calculating unit 51, based on the Ack unit response vector S86, calculates an Ack reception weight S61. The weighting combining unit 33 weights and combines the reception signals from each antenna, based on the Ack reception weight S61, and extracts an Ack unit reception packet. The signal becomes an Ack demodulator output S62 via the demodulator, and sent to the upper level scheduler as Ack information S84, after the content is confirmed in an Ack confirming unit 52.

The other control information such as a frame number may be included in the Ack packet as well as pilot signals and Ack information. The response timing of Ack is a DL timing subsequent to a UL packet reception frame, or a DL timing after a specified value (may be variable if the value is set in advance and shared in all the MTs and the BS) is framed.

It is preferable that the pilot E included in the Ack packet correspond one-to-one with the pilot G used for transmitting from each MT in the UL. If the pilot E does not correspond one-to-one, a pilot pattern to be used in the Ack packet is assigned to each MT by a method of some sort, or information indicating from which MT to which packet the Ack is transmitted is added in the Ack packet.

It is preferable that the known signals of pilot A to pilot G used in the explanation be an orthogonal pilot, respectively. This means, if there are eight patterns of signals to form the pilot A, each pattern is in an orthogonal relationship. If the orthogonal pilot is used, the response vector of a spatially multiplexed signal can be calculated more accurately, thereby improving the reception accuracy. To maintain orthogonality of the pilot signals, each pilot is arranged at adjacent subcarriers and the time-continuous OFDM symbol.

At step #1 to step #7, the DL and the UL are collectively described. However, the DL and the UL are controlled individually. In other words, the system may be formed only by the DL, or only by the UL (a system configuration that user data desired to transmit is only in one direction).

With the above processes, the transmission of information and the delivery confirmation performed by the Ack can be efficiently carried out, between the BS that includes a plurality of antennas, and the plurality of MTs that includes an antenna equal to or more than one.

In this manner, in the present embodiment, each MT transmitted a known signal for estimating channel with respect to the BS, so that the BS side can grasp the state of the downstream transmission path. Accordingly, the BS performs spatial scheduling based on the estimate (estimate partial channel information) and the estimation result of the downstream transmission path, by using the received known signal. Accordingly, the reception side (MT) does not need to feedback the estimation result and the like of the downstream transmission path to the BS. As a result, a high transmission efficiency can be obtained.

In addition, by applying the system shown in the present embodiment, the following advantages can be acquired, compared with the conventional wireless communication system.

As shown at step #3, the channel states of the uplink and downlink are notified from the response of the propagation path of the pilot signal, by using the reciprocity of the propagation path that is a characteristic of the TDD system. As a result, the channel information can be notified to the BS with higher efficiency, than when the channel information is fed back as an information bit. In particular, if a pattern orthogonal to the allocated pilot signals (pilot A) is used, it is possible to transmit a plurality of MTs and a plurality of beams at the same time in the same frequency.

As shown at step #3, the channel information based on the pilot signal is notified by providing a specific segment different from the data packet in the uplink. As a result, the channel states other than the MT that transmits the data packet (and pilot signals) in the uplink and the beam being used can be obtained. Accordingly, the transmission control can be chosen from various possibilities, in relation to the selection of the combination of the MT targeted for spatial multiplexing in the next frame and the beams to be used. In particular, in the packet exchange system, the MT does not necessarily transmit the packet simultaneously in the uplink and the downlink. The transmission control can be carried out without any problem even in such an asymmetric communication. This is effective irrespective of the value of $m_k$ (even $m_k=M_k$).

If it is $m_k<M_k$ at step #3, a special advantage of notifying good channel state by the number of pilot signals less than the number of antennas of the MT can be achieved.

Because the MT only needs to notify the channel information related to the beam to the BS, as many as the number of transmission path notification information pilots being allocated. Accordingly, the efficiency can be improved, by shortening the pilot signals for measuring the propagation path. The propagation path can also be measured at a short period of time. Conventionally, the pilots as many as the number of antennas of the MT were required or the time-division measurement needed to be carried out.

Because the UL control information (beam combining weight and MCS information to be used) is transmitted by being spatially multiplexed, it is possible to significantly improve the transmission efficiency.

Because the reception terminal's ID and the control information of MCS related to the DL packet are spatially multiplexed, it is possible to efficiently transmit the control information. By checking the terminal's ID included in the control information, the MT can recognize whether the information is addressed to the own MT.

Because the transmission terminal's ID, the MCS, and the transmission power information related to the UL packet are notified in the downlink using spatial multiplexing, it is possible to efficiently transmit the control information. By checking the terminal's ID included in the control information, the MT can recognize whether the information is addressed to the own terminal.

Because the Ack of the DL packet is spatially multiplexed and transmitted, without performing another spatial scheduling, it is possible to significantly improve the transmission efficiency.

Because the Ack signal with respect to the UL packet and the DL packet is returned in the same combination at the defined position, the Ack can be spatially multiplexed and transmitted without performing another spatial scheduling. Accordingly, it is possible to significantly improve the transmission efficiency.

At step #6B, if the BS stores therein the UL scheduling information, and identifies the terminal's ID and the MCS from the correspondence with the pilot pattern G included in the UL packet, it is possible to reduce the amount of control information included in the UL packet.

In this manner, by applying the system configuration according to the present invention to the wireless communication system, spatially multiplexed packet transmission can be achieved with respect to the MT and the beam with good propagation state, among various possibilities. Accordingly, it is possible to significantly improve the transmission performance, than when the spatial multiplexing is performed targeting only a single MT as shown in the related art.

In the system according to the present invention, the channel state can be acquired from the MTs more than the number of antennas N of the BS, and the MTs equal to or less than N terminal that performs spatial multiplexing can be selected. Accordingly, it is possible to achieve further higher transmission efficiency than when the MT equal to or less than N terminal fixedly performs spatial multiplexing.

Second Embodiment

A wireless communication system and a communication control method according to a second embodiment will now be explained. The configurations of the wireless communication system, the BS, and the MT according to the present embodiment are the same as those in the first embodiment. In recent mobile communication systems, a broadband system in which a delay amount of a delayed wave exceeds the symbol interval has become a mainstream. In other words, the transmission paths differ significantly in the system bandwidth. Subsequently, the state of partial space and the SINR of each beam when beams are combined are also expected to differ significantly in the system bandwidth. Accordingly, it is not realistic to manage the entire bandwidth by the same combination of beams. Therefore, in the communication system according to the present embodiment, the entire bandwidth is used by dividing into a plurality of sub-bands.

Figure 6:
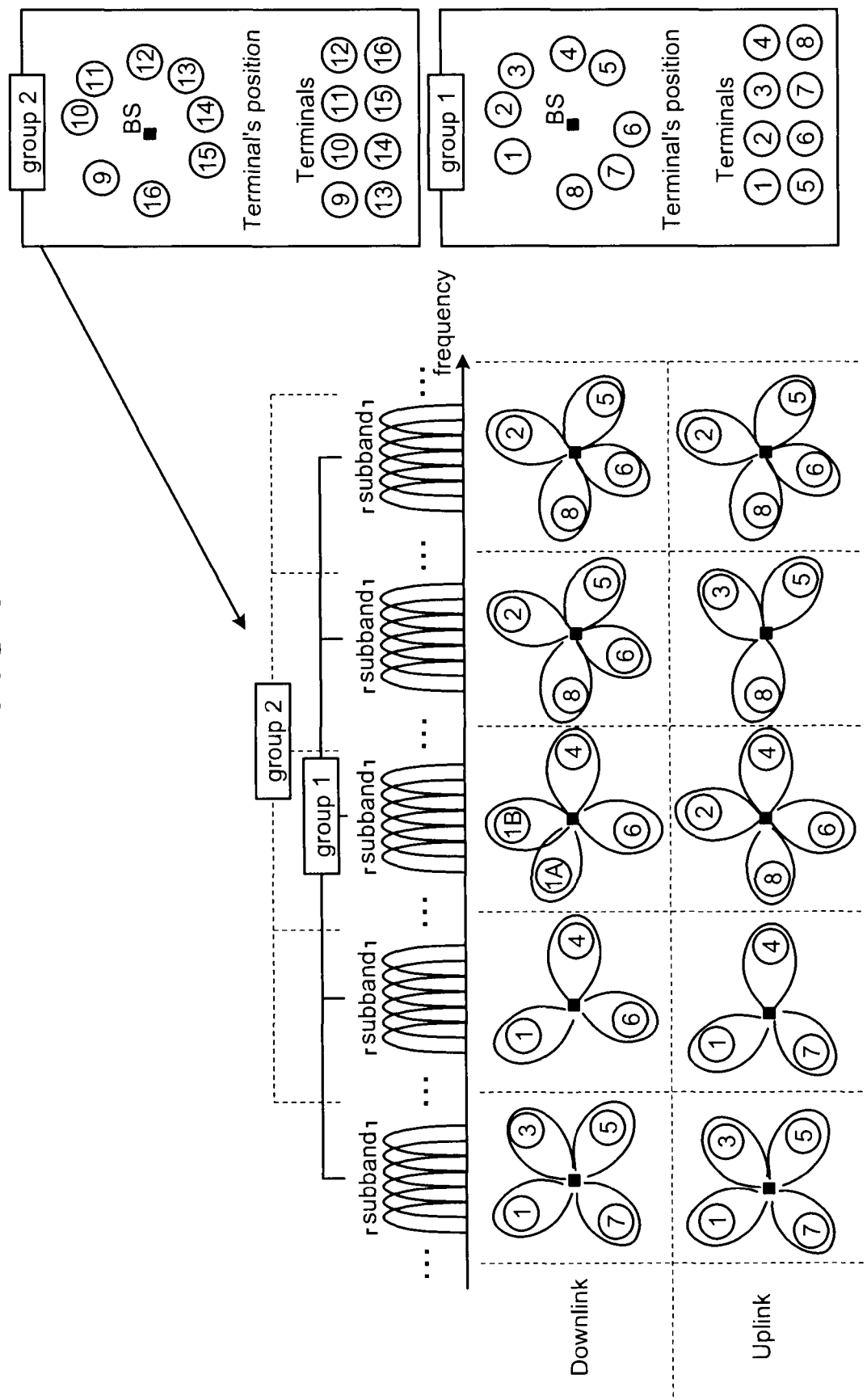
FIG. 6 is a schematic diagram of an example of allocated sub-bands in a communication system used by dividing the entire bandwidth into a plurality of sub-bands.

FIG. 6 is a schematic diagram of an example of allocated sub-bands in a communication system used by dividing the entire bandwidth into a plurality of sub-bands. The sub-band bandwidth, compared with a coherent bandwidth in which the transmission paths are considered to be approximately uniform, the same or a narrower value is adopted therefor. A sub-band group is formed by collecting one or a plurality of sub-bands. An example in FIG. 6 is divided into two sub-band groups. However, it is possible to divide into sub-band groups of any natural number. In general, from the viewpoint of frequency diversity, a sub-band group is formed by collecting sub-bands disposed as far as possible. In FIG. 6, a black square indicates the BS, and the encircled numbers 1 to 16 therearound indicate the MT#1 to the MT#16. In other words, a positional relationship between the BS and each MS (MS#1 to #16) is shown.

The BS assigns the sub-band group to be used for all the MTs under the control of the BS. In an example in FIG. 6, among the MT#1 to the MT#16 that are under the control of the BS, the Mt#1 to the MT#8 are allocated to a group 1 that uses a sub-band group 1, and the MT#9 to the MT#16 are allocated to a group 2 that uses a sub-band group 2. The allocated sub-band group is not limited to one, and a plurality of sub-bands may be allocated to the MT requesting broadband communication. In general, the sub-band group includes a plurality of sub-bands, but the sub-band group may also be formed by one sub-band. In this case, the MT assigns a sub-band group to be used in a sub-band unit. The sub-band group is assigned, for example, by a scheduling unit (in the BS formed as in FIG. 2, the UD spatial scheduling unit 17 and the UL spatial scheduling unit 18) of the BS.

Because there are various evaluation indexes, the allocation of the MT to which group is not defined here. However, in general, a plurality of MTs that includes transmission paths situated closer when viewed from the BS are allocated to different groups. For example, the MTs with highly correlated response vector acquired from the beam information shown in the first embodiment are considered to have close transmission paths. The allocation of the group to the MT may be changed at a regular interval, based on the traffic state and the movement of the MT. The state (state when one-to-one communication is performed with the BS) of the entire sub-band can be obtained at the side of the MT, using the notification information (pilot C) received from the BS. Accordingly, a candidate for the sub-band group desired to be used may be transmitted to the BS at the entry (operation that corresponds to step #1 in the first embodiment), or on a request to change the sub-band group. Subsequently, it may be considered that the BS allocates the sub-band group based on the candidate information received from each MT. It may also be considered that the BS allocates the sub-band group by taking into account a QoS request (such as request transmission speed, request delay, and request packet error rate).

In the above-described system according to the second embodiment, the spatial multiplex communication scheme disclosed in the first embodiment is only carried out, in the MT allocated into sub-bands. In other words, in the sub-band that belongs to the sub-band group 1 in the example in FIG. 6, the pilot allocation and the like for notifying beam information is carried out only for the MT#1 to the MT#8. With this, the number of pilot signals can be significantly reduced, and the packet used for notifying beam information can also be reduced. Because the transmission beam needs to be optimized only with the limited MT (and the partial space thereof), it is possible to significantly reduce the amount of calculation, compared with when the entire MT is targeted. Because the transmission paths in the sub-band can be considered approximately uniform, the power parameter η or beam information is transmitted respectively in a sub-band unit.

Third Embodiment

A third embodiment will now be explained. The configurations of the wireless communication system, the BS, and the MT according to the present embodiment are the same as those in the first embodiment. In the present embodiment, an operation of transmitting a signal efficiently, based on a frame structure shown in FIG. 4 will be explained, as an example to realize the system of the present invention. One sub-band used to perform spatial scheduling in a sub-band unit of the OFDM shown in the second embodiment will be explained.

As shown in FIG. 4, with the beam information at step #3 shown in the first embodiment, an average response vector in the sub-band can be acquired, by transmitting the pilot A at the "near center" of the sub-band. The "near center" indicates the state that the pilot signals are transmitted at a portion excluding 30% of both sides with respect to the width of the sub-band.

If the power parameter η is notified in the same frame as the pilot A at step #3 shown in the first embodiment, the MT transmits the power parameter η on a subcarrier "adjacent" to the pilot A, as shown in FIG. 4. The "adjacent" indicates the state that the mutual field is disposed within a range equal to or less than 30% with respect to the sub-band. With the present transmission scheme, it is possible to consider that the power parameter η and the pilot A are transmitted on channels at approximately the same state.

At the side of the BS, a phase rotation in the propagation path needs to be corrected, before receiving the power parameter η. It is possible to detect p further accurately, by combining the power parameter η received by an N antenna of the BS with a certain reception weight. At this time, the BS can generate a reception weight of η, by using a response vector $b_{k,m}$ of a beam m from the MT#k acquired from the pilot A. There are various reception weights, such as a maximum ratio combining weight and an MMSE combining weight. If the power parameter η and the pilot A can be considered to be transmitted at the same channel state, the power parameter η, in particular, can be detected highly accurately by the present configuration.

In FIG. 4, the propagation state at the transmission field can be considered approximately the same, by transmitting the pilot A in a continuous time and subcarriers. As a result, the orthogonality of pilot signals can be easily maintained, even if a plurality of beams or the MTs transmit the pilot A for the same period of time at the same frequency region, by using an orthogonal pilot pattern.

Similarly, with respect to the other pilots B to F in FIG. 4, the orthogonality of pilot signals for controlling, which are spatially multiplexed, can be easily maintained, by transmitting in a continuous time and subcarriers. As a result, the MT and the BS can generate a required response of the propagation path with high accuracy, from the pilot signals. Accordingly, it is possible to detect signal or generate weight with high accuracy.

In FIG. 4, a plurality of pilot signal groups that include different transmission beams in one frame is transmitted in the downlink. For example, the pilot C is individually transmitted from each antenna of the BS. The pilot D is transmitted by the transmission beam corresponding to the uplink scheduling information. The pilot E is transmitted by the transmission beam corresponding to the packet received in the uplink of a previous frame. In the data packet area of the downlink, the pilot F corresponding to the downlink scheduling is transmitted. In this manner, by transmitting the pilot signal groups that include different transmission beams in one frame, it is possible to smoothly control the transmission in the uplink and the downlink.

When the BS transmits the UL control information (uplink scheduling notification information) at step #5B, as shown in FIG. 4, the BS transmits the pilot D, the terminal's ID, the MCS information, the transmission power information, and the beam information by the subcarrier "adjacent" to the pilot D. As a result, the MT can detect these control information with high accuracy.

Similarly, with the ACK transmission performed at steps #6 and #7, the ACK information can be notified with high efficiency, by transmitting the pilot E or the pilot B and the ACK information by the "adjacent" subcarrier.

As shown in FIG. 4, by transmitting the control information transmitted at steps #5A to #7, using the subcarrier "adjacent" to the subcarrier that transmitted the beam information at step #3, it is possible to transmit the control information at approximately the same propagation state as the response vector acquired at step #3. As a result, it is possible to reduce control error on the transmission of the control signal, generated when the propagation states between the response vector acquired at step #3 and the control information transmitted at steps #5A to #7 are different.

As a special example, as shown in FIG. 4, the propagation state of each control signal can be considered approximately the same, by blocking the control signal in the sub-band.

It is also possible to transmit by only using a part of time symbol in the time frame, instead of arranging the control signal over all the time symbols as shown in FIG. 4. In general, the MT that is not transmitting a packet only needs to detect control information, thereby performing the FFT process only to the time symbol that includes the control signal. In this case, if the control signal is transmitted by only using a part of time symbol in the time frame, the MT that is not transmitting packet can reduce the number of time symbols that perform the FFT process. Accordingly, the signal process of the MT can be efficiently improved.

As described above, a control and a packet transmission with higher accuracy can be achieved, by properly (as shown in the example in FIG. 4) arranging the subcarrier field that transmits signals.

Fourth Embodiment

A fourth embodiment will now be explained. The configurations of the wireless communication system, the BS, and the MT are the same as those in the first embodiment. In the present embodiment, a quality measurement operation of each beam, required when the BS performs the downlink spatial scheduling is explained.

As shown in the first embodiment, the BS needs to calculate the SINR of each beam, on selecting the combination of beams that performs simultaneous transmission. An uplink pilot signal appropriate for calculating the SINR, and a method of estimating the received SINR at the MT in the downlink by using the signal, carried out by the BS will be explained. Because similar operations are carried out in the entire MT, the explanation is made by assuming a specific MT, and omitting the terminal number (k).

When the BS transmits a signal $s_{DL}(j)(p)$ at N×1 transmission weight vector $w_{DL}(j)$ in the downlink sub-band (referred to as "sub-band j") will be explained. However, it is $E[|s_{DL}(j)(p)|^2]=1$. If the transmission power of the signal $s_{DL}(j)(p)$ is $P_{BS}^{(j)}$, a reception signal $x^{(j)}(p)$ of p-th symbol in the beam m of the sub-band j in the MT is indicated by Equation (7).

[Numerical Expression 6]

$$x_m^{(j)}(p) = \sqrt{P_{BS}^{(j)}} h_m^{(j)} w_{DL}^{(j)} s_{DL}^{(j)}(p) + z_m(p) \quad (7)$$

Here, $h_m(j)=[h_{m,1}(j), \ldots, h_{m,N}(j)]$ is 1×N vector, and $h_{m,n}(j)$ represents a complex propagation coefficient (linear combining the response from each reception antenna by the reception weight of the beam m) to the beam m (m-th beam) of the MT from n-th antenna of the BS. $z_m(j)(p)$ is an interference and a noise component from the other BS in the beam m of the MT, and includes an interference noise power $E[|z_m(j)(p)|^2]=I_m(j)$. The interference noise power $I_m(j)$ differs by sub-band, by the surrounding usage environment, the interference, and the fading. At this time, the received SINR of the MT is given with $\gamma_m(j)=P_{BS,j}|h_m(j)w_{DL}(j)|^2/I_m^{(j)}$. Conventionally, the SINR is measured at the reception side (side of MT), and fed back to the BS as an information bit.

However, in the conventional method, the communication efficiency deteriorates with an increase of the number of sub-bands to be notified and the number of MTs accessed simultaneously. In the conventional method, there is also a problem that the MT cannot measure the received SINR, if the signal is actually transmitted in the downlink. As a result, the BS cannot obtain the received SINR of the MT in advance, of which when various transmission weights are assumed. Contrarily, in the present invention, the BS can estimate the received SINR of the MT, by using the known signal (pilot A) received in the uplink, without actually transmitting a downlink signal. The method will now be explained. To simplify, the sub-band is denoted by serial number j, but as shown in the second embodiment, the sub-bands do not need to have adjacent frequencies.

The MT measures an interference noise power $I_m(j)$ of the m-th beam in the sub-band $j(=1, \ldots, J)$. The MT then transmits the pilot signals (pilot A) indicated by Equation (8), from the $m(=1, \ldots, m_k^{(j)})$-th beam in the sub-band j.

[Numerical expression 7]

$$s_{UL,m}^{(j)}(p) = \sqrt{\eta} \frac{r_m^{(j)}(p)}{\sqrt{I_m^{(j)}}} \quad (8)$$

$r_m(j)(p)$ is a unit of a pilot signal ($|r_m^{(j)}(p)|=1$). $\eta$ is a power parameter that represents a transmission power level, and $\eta$ is commonly used for transmitting the m-th beam and the pilot signal in the sub-band j.

If $M_k^{(j)}$ pieces of pilot signals are transmitted in the sub-band j, the MT controls the transmission power by adjusting the power parameter $\eta$, so as the total received power of all the pilot signals at the BS becomes equal to Expression (9).

[Numerical expression 8]

$$P_0 \sum_{j=1}^{J} m_k^{(j)} \quad (9)$$

$P_0$ is a target value of the average received power per one pilot signal, and set higher than the interference noise power of the BS. Among various methods of controlling $\eta$, for example, there is a method that the BS measures the received power of the pilot signals and instructs the MT to increase/decrease $\eta$. The pilot A in the present embodiment is transmitted at the transmission power inversely proportional to the interference power $I_m^{(j)}$ of the beam m.

If the MT transmits the pilot A from the beam m of the sub-band j in the TDD system in which the reciprocity of the propagation path is satisfied, the BS acquires N×1 reception signal vector $x_{BS}^{(j)}(p)$ in the sub-band j, as shown in Equation (10).

[Numerical expression 9]

$$x_{BS}^{(j)}(p) = \sqrt{\frac{\eta}{I_m^{(j)}}} h_{lm}^{(j)T} r_m^{(j)}(p) + z_{BS}^{(j)}(p) \quad (10)$$

$x_{BS}(j)(p)$ is N×1 reference noise vector in the sub-band j at the BS. The BS estimates a received SINR at the beam m in the sub-band j of the MT, by using the transmission power $P_{BS}(j)$ and the transmission weight $w_{DL}^{(j)}$ assumed in the downlink and feedback information $\eta$.

[Numerical expression 10]

$$\gamma_m^{(j)pre} = \frac{P_{BS}^{(j)}}{\eta} \left| \left( \frac{1}{p0} \sum_{p=1}^{p0} r_m^{(j)}(p)^* x_{BS}^{(j)}(p)^T \right) w_{DL}^{(j)} \right|^2 \quad (11)$$

At this time, p0 represents the number of symbols of the pilot signal A, and the superscripts "*" and "T" respectively represent complex conjugate and transpose. In an ideal control state $(z_{BS}^{(j)}(p)=0)$, Equation (11) becomes Equation (12), and the estimated SINR and the received SINR in the MT match completely.

[Numerical expression 11]

$$\gamma_m^{(j)pre} = P_{BS,j} \frac{|h_m^{(j)} w_{DL}^{(j)}|^2}{I_m^{(j)}} = \gamma_m^{(j)} \quad (12)$$

In a non-ideal control state $(z_{BS}(j)(p) \neq 0)$, a prediction error occurs. However, the prediction error can be suppressed, if $\eta$ is set so as the average received power $P_0$ per one pilot signal is higher than the interference noise power of the BS.

In Equations (10) to (12), the MT only used one beam. However, the similar process is individually applicable with respect to a plurality of beams (such as beams m1 and m2), by using pilot signals $r_{m1}(j)(p)$ and $r_{m2}^{(j)}(p)$.

If $r_{m1}(j)(p)$ and $r_{m2}(j)(p)$ that satisfy $m1 \neq m2$ are orthogonal pilot signals that satisfy an orthogonal condition shown in Equation (13), even if the pilot signals $r_{m1}(j)(p)$ and $r_{m2}(j)(p)$ are simultaneously transmitted, the pilot signal components excluding the pilot signal $r_m^{(j)}(p)$ is eliminated from the parenthesis in the right-hand side of Equation (11).

[Numerical expression 12]

$$\sum_{p=1}^{p0} r_{m1}^{(j)}(p)^* r_{m2}^{(j)}(p) = 0 \quad (13)$$

Accordingly, the pilot signals $r_{m1}(j)(p)$ and $r_{m2}^{(j)}(p)$ can be simultaneously transmitted, without degrading the estimated SINR of each beam. Similarly, the estimated SINR will not be degraded, when the MTs simultaneously transmit the orthogonal pilot A.

In this manner, by transmitting the uplink pilot signals (pilot A) of the beam m in the sub-band j, by a transmission power inversely proportional to the interference power $I_m^{(j)}$, the BS can estimate the received SINR at each beam of the MT in the downlink, by using the received pilot signals.

In the example, the BS transmitted one desired signal $s_{DL}(j)(p)$, by using beamforming based on the transmission weight $w_{DL}(j)$. However, if $s_{DL}(j)(P)$ is not the desired signal, the above-described $\gamma_m(j)pre$ is a ratio between an interference power given to the MT from the other signal $s_{DL}(j)(P)$ transmitted by the BS, and an interference power (interference of the other cell) from the other BS. Because the BS can calculate $\gamma_m(j)pre$ by assuming an optional transmission power $P_{BS}(j)$ and a transmission weight $w_{DL}(j)$, it is also possible to estimate a ratio between an interference power at the MT generated from the other signal spatially multiplexed by the BS and the power $I_m(j)$. Accordingly, if the BS spatially multiplexes a signal, $\gamma_{m,sig}(j)pre$ that is a ratio between the desired signal power at the m-th beam of the MT and the power $I_m(j)$, and $\gamma_{m,int}^{(j)pre}$ that is a ratio between the interference power at the MT generated from the other signal spatially multiplexed by the same BS and the power $Im^{(j)}$ are calculated. Accordingly, the received SINR of the MT, the sub-band j, and the beam m while being spatially multiplexed can be estimated as Equation (14).

[Numerical expression 13]

$$\Gamma_{m,SDM}^{(j)} = \frac{\gamma_{m,sig}^{(j)pre}}{\gamma_{m,int}^{(j)pre} + 1} \quad (14)$$

With this, the BS can estimate the received SINR at the MT, while being spatially multiplexed, based on an optional transmission power and a transmission weight.

In this manner, according to the present embodiment, if a plurality of sub-bands or a plurality of beams are used, each MT feedbacks one power parameter η and the pilot signal at each sub-band to the BS, so that the BS can estimate the received SINR at the side of the MT. Accordingly, an effective communication is possible, by reducing the feedback information (than when a conventional method is applied). Feedback of error-free control information is also possible, by focusing the power of the MT with less transmission power on the transmission of η in one sub-band.

The BS can also estimate the received SINR, by setting the transmission power $P_{BS}(j)$ and the transmission weight $w_{DL}^{(j)}$ assumed in the downlink into various values. Accordingly, the reception quality in the downlink can be verified, by assuming various states. This control cannot be carried out in the conventional method that feedbacks the signal quality by actually transmitting a signal in the downlink. By using the present invention, a lot of possibilities related to the spatial multiplexing can be verified, and the transmission power, the receiving MT, the reception beam of the MT, and the MCS that can achieve an excellent transmission state can be efficiently selected.

Fifth Embodiment

A fifth embodiment will now be explained. The configurations of the wireless communication system, the BS, and the MT of the present embodiment are the same as those in the first embodiment. In the present embodiment, a beam selection operation and a spatial scheduling operation performed by the BS based on the estimation result of the received SINR of each MT are explained. As an example of an estimation operation of the received SINR, a beam selection and a downlink spatial scheduling are carried out by using an operation based on the Zero-Forcing criterion will be explained.

As shown in FIG. 4, on the reception of the pilot signals (pilot A) from the MT, the BS can estimate the received SINR at the MT, by assuming various states of spatial multiplexing. Consider when the BS respectively transmits $1, \ldots$ , n-th spatially multiplexed signals, to the beam $m_{k(n)}$ of the beams $m_{k(1)}, \ldots$ , MT#k(n) of the MT#k(1).

Based on the Zero-Forcing criterion, the transmission weights $w_1, \ldots, w_n$ of the BS that correspond to the spatially multiplexed signals $1, \ldots$ , n can be calculated by using Equation (15).

[Numerical Expression 14]

$$\sqrt{P_s}[w_1, \ldots, w_n] = B^*(B^T B^*)^{-1} P'^{1/2}$$

$$B = [H_{k(1)}{}^T v_1, \ldots, H_{k(n)}{}^T v_n]$$

$$P' = \text{diag}[P_1', \ldots, P_n'] \quad (15)$$

$v_n$ is the received vector of the n-th spatially multiplexed signal, and if the beam $m_k$ of the MT#k receives thereof, it is $v_n = v_{k,m}$. P' is n×n diagonal matrix, and diagonal elements $P_1', \ldots, P_n'$ are an adjusting parameter to normalize ($|w_1|=1$) the transmission weight. At this time, $BT[w_1, \ldots, w_n]=P'1/2/P_s^{1/2}$ is satisfied by Equation (15), and a relationship of Equation (16) can be acquired.

[Numerical expression 15]

$$(H_{k(n)}^T v_n)^T w_1 = v_n^T (H_{k(n)} w_1) \quad (16)$$

$$= \begin{cases} \sqrt{P_n'/P_s} & 1 = n \\ 0 & 1 \neq n \end{cases}$$

At this time, $v_n T(H_{k(n)} w_1)$ coincides with an output amplitude of the first signal, when the MT#k receives signal, by using the reception weight $v_n$ in the downlink. In other words, Equation (16) can make the interference generated other than from the desired n-th multiplexed signal at the MT#k to 0 (zero). Similarly, with the Zero-Forcing weight, a desired signal can be received, while eliminating the spatially multiplexed signal other than the desired signal, in the entire reception terminal (MT).

The BS, based on the following algorithm, determines the receiving MT#k(n), the reception beam number m (=1, 2, ..., $m_k$), the transmission weight $w_n$, and the MCS of the spatially multiplexed signal n.

(Procedure DL1-1)

$$n_{max} = 1$$

(Procedure DL1-2)
From all the possible combinations of the MT#k and the beam mk, $n_{max}$ pieces is selected, and the transmission weight is calculated with respect to the combinations, by using Equation (15).

(Procedure DL1-3)
Based on Equation (14), a received $SINRG_n$ of the signal n (=1, ..., $n_{max}$) with respect to the selected combinations of the MT and the beam is estimated.

(Procedure DL1-4)
A throughput $\xi_n$ of the signal n is calculated based on the received $SINRG_n$ acquired in the above (procedure DL1-3). A system throughput $\Xi$ of the entire spatially multiplexed signal is calculated based on Equation (17).

[Numerical expression 16]

$$\Xi = \sum_{n=1}^{nmax} \xi_n \quad (17)$$

The operations of the above (procedure DL1-2) to the (procedure DL1-4) are carried out with respect to the entire selection patterns of the MT and the beam, within a range of $n_{max}=1, \ldots, N$ (N: the number of antennas of the BS). Among these, the number $n_{max}$ of spatially multiplexed with the highest system throughput and a combination of the receiving MT#k(n) of the spatially multiplexed signal n and the beam number $m_{k(n)}$ thereof are selected.

(Procedure DL-6)

An MCS of the signal n (=1, ..., $n_{max}$) is determined from the received SINRG$_n$ of the spatially multiplexed signal n, acquired under the combination of the receiving MT#k(n) and the beam number $m_{k(n)}$(n=1, ..., $n_{max}$) thereof selected in the above (procedure DL1-5).

Figures 7, 8:
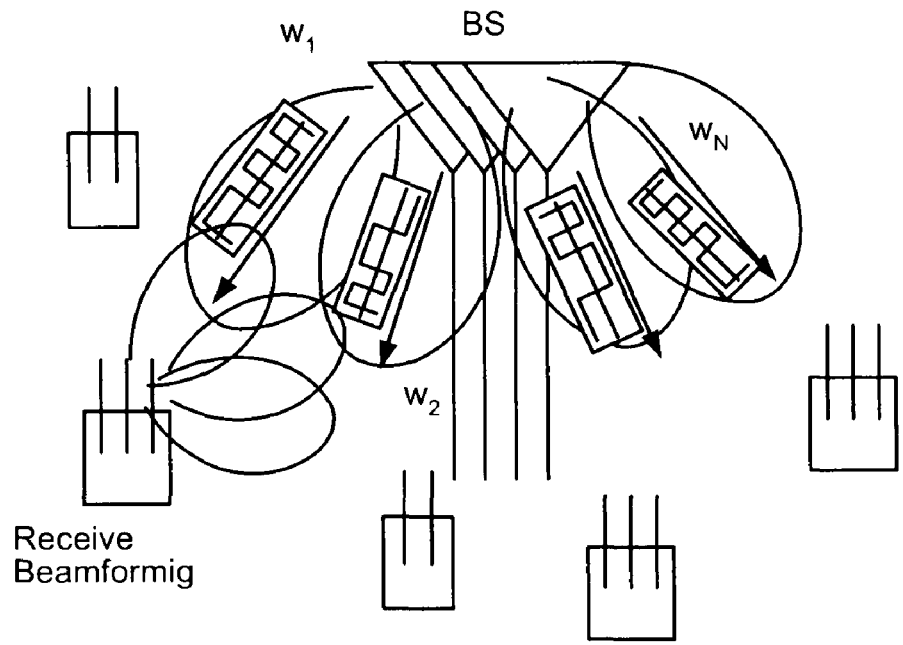
FIG. 7 is a schematic of a table used when a throughput and an MCS are determined based on a received SINR.
FIG. 8 is a schematic diagram of an example of a state in which the BS is spatially multiplexing a packet in a downlink.

At this time, the throughput $\xi_n$ of the packet and the MCS are functions defined in advance from the received SINR. FIG. 7 is an example of a table used when a throughput and an MCS are determined from the received SINR. The present table is formed in advance as a corresponding table of the SINR and the MCS that a good packet error rate (PER) or a throughput can be obtained from the result, by measuring the transmission under various received SINR environments in advance. A throughput is also determined based on the determined MCS, and described in the table.

An example of a spatial scheduling algorithm that determines a transmission destination MT#k(n) of the n (=1, ..., $n_{max}$)-th spatially multiplexed signal and the transmission weight $w_n$ thereof in a sequence of n=1, 2, with a low calculation amount will now be described.

(Procedure DL2-1)

$$N=1, \Xi(0)=0$$

(Procedure DL2-2)

Under the presence of the multiplexed signals 1 to (n−1), a transmission weight if the signal n is transmitted with respect to the possible MT#k=1, ..., K and the beam of the MT, is calculated based on Equation (15). Then, based on Equation (14), the received SINR of the signal n at that time is estimated.

(Procedure DL2-3)

The MT#k and the beam $m_k$ of which the received SINR of the signal n becomes the maximum are selected as the receiving MT and the reception beam of the multiplexed signal n.

(Procedure DL2-4)

The system throughput $\Xi(n)$ at the number n of spatially multiplexed signal is calculated, and if "$\Xi(n) > \Xi(n-1)$", go to (procedure DL2-5). In any other event, go to (procedure DL2-6) as $n_{max}=n-1$. The system throughput is calculated by the method shown in the above (procedure DL1-4).

(Procedure DL2-5)

If "n<N", return to (procedure DL2-2). If "n=N", calculate the transmission weights $w_1, \ldots, w_n$ based on Equation (15), and go to (procedure DL2-6) as "$n_{max}=N$".

(Procedure DL2-6)

An MCS of the signal n (=1, ..., $n_{max}$) is determined from the received SINRG$_n$ at the MT#k(n) of the signal n (=1, ..., $n_{max}$) acquired from the combination of the selected $n_{max}$ pieces of receiving MT#k and the beam $m_k$ thereof.

With the above processes, the BS determines a combination (n=1, ..., $n_{max}$) of the receiving MT#k(n) and the transmission weight $w_n$ thereof, and the MCS. In the present algorithm, a spatially multiplexed signal is added sequentially. If the system throughput of which the number of multiplexed signal is "n" is higher than the system throughput of which the number of multiplexed signal is "n−1", the BS allows the n-th spatially multiplexed signal.

With the present embodiment, the spatial scheduling based on the received SINR can be achieved. The transmission beam determined by the present algorithm places a null in the direction of the entire receiving MT excluding the desired MT, thereby realizing efficient communication.

In the present embodiment, it is also possible to perform downlink transmission power control. More specifically, the transmission power $P_{BS,j}$ (for example, $P_{BS,j}$ in Equation (14)) of the BS shown in the fourth embodiment can be adjusted per signal n, so as the received SINR becomes a required value, after selecting the receiving MT#k (n) and the transmission weight $w_n$ thereof by the algorithm. In particular, if a Zero-Forcing weight is used, the spatially multiplexed signal places a null in the direction of the entire receiving MT excluding the desired MT, and it is $\gamma_{m,int}(j)$pre=0. As a result, the signal n (=1, ..., $n_{max}$) can adjust the transmission power without being interfered with one another.

In this manner, according to the present embodiment, the BS can obtain more channel information, by receiving pilot signals (pilot A) from each MT in a specific segment different from the data packet transmission on the uplink. Accordingly, it is possible to select a combination with high transmission efficiency from various combinations of the MTs and the transmission beams in the downlink spatial multiplexing, by verifying various states of spatial multiplexing. This is the control that cannot be achieved by the conventional method that does not provide a specific pilot transmission segment.

By using the pilot signals that take into account the interference of the MT shown in the fourth embodiment, a combination of the MT and the transmission beam that can achieve high throughput, based on the throughput can be selected from various possibilities.

Sixth Embodiment

A sixth embodiment will now be explained. The configurations of the wireless communication system, the BS, and the MT of the present embodiment are the same as those in the first embodiment. In the present embodiment, a quality measurement method of each beam, required when the BS performs the uplink spatial scheduling is described.

As shown in the first embodiment, the SINR of each beam needs to be calculated, on selecting the combination of beams that performs simultaneous transmission. Here, a method of estimating the received SINR of the uplink signal using the uplink pilot signal performed by the BS will be explained. Because similar methods are used in the entire MT, the explanation is made by assuming a specific MT, and omitting the terminal number (k).

When the MT transmits a signal $s_{UL}(j)(p)$ using the N×1 transmission weight vector $v_{k,m}(j)$ in the sub-band j of the uplink is explained. At this time, it is $E[|S_{UL}(j)(P)|^2]=1$. If the signal $S_{UL}(j)(p)$ is transmitted at the transmission power $P_k(j)$, the reception signal $x(j)_{BS}(p)$ in the sub-band j of the BS is expressed by Equation (18), in the TDD system in which the reciprocity of the propagation path is satisfied.

[Numerical Expression 17]

$$x_{BS}^{(j)}(p)=\sqrt{P_k^{(j)}}h_m^{(j)T}s_{UL}^{(j)}(p)+z_{BS}^{(j)}(p) \quad (18)$$

At this time, $h_m(j)=[h_{m,1}(j), \ldots, h_{m,N}]$ is 1×N vector, and $h_{m,n}(j)$ represent a complex propagation coefficient to the m-th beam of the MT from the n-th antenna of the BS. $z_{BS}(j)(p)$ is an interference noise component from the other cell in the BS, and a N×N correlation matrix of the interference noise component includes $E[z_{BS}(j)(p)z_{BS}(j)(p)H]=R_{BS}(j)$. The interference noise correlation matrix $R_{BS}^{(j)}$ differs by each sub-band, by the surrounding usage environment, the interference, and the fading.

The BS can measure a response vector of the signal shown in Equation (19) as a response of the pilot signal $A(s_{UL}^{(j)}(p))$.

[Numerical Expression 18]

$$b_{k,m}^{(j)}=\sqrt{P_k^{(j)}}h_m^{(j)T} \quad (19)$$

The uplink pilot signal $s_{UL}(j)(p)$ may be any signal. For example, if the pilot A from the MT dealt in the forth embodiment is to be used, the MT transmits the pilot signals (pilot A) shown in Equation (20), from the m (=1, ..., $m_k$)-th beam in the sub-band j (=1, ..., J). However, it is not limited to this and the other pilot signal transmission method can also be used.

[Numerical expression 19]

$$s_{UL,m}^{(j)}(p) = \sqrt{\eta} \frac{r_m^{(j)}(p)}{\sqrt{l_m^{(j)}}} \quad (20)$$

The response vector can also be measured if the MT simultaneously transmits the pilot signals $r_{m1}(j)(p)$ and $r_{m2}(j)(p)$ with respect to a plurality of beams m1 and m2. In particular, if m1≠m2, when $r_{m1}(j)(p)$ and $r_{m2}(j)(p)$ are orthogonal pilot signals that satisfy Equation (13) shown in the fourth embodiment, the response vector of the pilot signals can be measured at the same time, without degrading the measurement accuracy. The BS measures the response vector $b_{k,m}^{(j)}$ indicated in Equation (19) by each MT and a beam unit.

The BS then estimates the received SINR at the BS, by assuming that the MT#k transmits the spatially multiplexed packet by using the beam mk in the uplink, by the transmission power a times to that when the pilot A for notifying channel is transmitted. Before estimating, the MT and the beam that perform spatially multiplexed packet transmission simultaneously are made to be k0 and m0. The MT of k0 (hereinafter, "MT#k0") transmits the packet at the transmission power $a_{k0,m0}$ times to that when the pilot signals (pilot A) for notifying channel are transmitted. At this time, in Equation (21), the BS estimates the received SINR when the signals from the beam m of the MT#k are combined and received based on the reception weight $w_{UL}^{(j)}$ in the sub-band j.

[Numerical expression 20]

$$\gamma_{k,m,UL}^{(j)} = \alpha \frac{|w_{UL}^{(j)T} b_{k,m}^{(j)}|^2}{w_{UL}^{(j)T}(R_{BS}^{(j)} + R_{i-cell}^{(j)})w_{UL}^{(j)*}} \quad (21)$$

At this time, $R_{i-cell}(j)$ represents Equation (22), and the right side represents a sum related to the MT#k0 and the beam m0 simultaneously spatially multiplexed in the uplink. The superscript "H" indicates conjugate transpose. The interference noise correlation matrix $R_{BS}^{(j)}$ is measured in advance in the BS.

[Numerical expression 21]

$$R_{i-cell}^{(j)} = \sum_{k0,m0} a_{k0,m0} b_{k0,m0}^{(j)} b_{k0,m0}^{(j)H} \quad (22)$$

With the above procedures, the BS measures the response vector $b_{k,m}^{(j)}$ by using the uplink pilot signals (pilot A), and using the result, the BS can estimate the received SINR used when the MT performs spatially multiplexed packet transmission.

In this manner, in the present embodiment, the BS receives the pilot signals from the MT in the specific segment different from the data packet in the uplink, and by using the pilot signals, the transmission power (above-described a) and the reception weight (above-described $w_U^{(j)}$) assumed at the transmission of data packet can be set to various values, and the reception quality can be verified by estimating the received SINR. Accordingly, it is possible to verify many possibilities related to the spatial multiplexing and the transmission power, the receiving MT, the reception beam of the MT, and the MCS that can achieve an excellent transmission state can be selected efficiently.

Seventh Embodiment

A seventh embodiment will now be explained. The configurations of the wireless communication system, the BS, and the MT according to the present embodiment are the same as those in the first embodiment. In the present embodiment, a beam selection operation and a spatial scheduling operation based on the estimation result of the received SINR of each MT performed by the BS will be described in detail. As an example of estimation operation of the received SINR, when the beam selection and the uplink spatial scheduling are performed, by using an operation based on the Zero-Forcing criterion will be described.

As shown in the sixth embodiment, when the BS receives pilot signals (pilot A) from each MT, the received SINR at the MT can be estimated, by assuming various states of spatial multiplexing. Consider that in the BS, the beam $m_k$ of the MT#k(n) transmits the spatially multiplexed signal n in the uplink.

Based on the Zero-Forcing criterion, the reception weights $w_{1,UL}, \ldots, w_{n,UL}$ of the BS can be calculated using Equation (23).

[Numerical Expression 22]

$$\sqrt{P_s}[w_{1,UL}, \ldots, w_{n,UL}] = B_{UL}^*(B_{UL}^T B_{UL}^*)^{-1}$$

$$B_{UL} = [b_1^{(j)}, \ldots, b_n^{(j)}] \quad (23)$$

$b_n(j)$ is the received vector of the n-th signal, and if the beam $m_k$ of the MT#k(n) transmits the signal n, it is $b_n(j) = b_{k,m}^{(j)}$. With the Zero-Forcing weight, a desired signal can be received while eliminating the spatially multiplexed signal excluding the desired signal in the BS.

The BS, based on the following algorithm, determines the transmitting MT#k(n), the reception beam number m (=1, 2, ..., $m_k$), and the MCS of the signal to be spatially multiplexed.

(Procedure UL1-1)

$n_{max} = 1$ (Procedure UL1-2)

$n_{max}$ pieces are selected from all the possible combinations of the MT#k and the beam m, and the reception weight being spatially multiplexed is calculated, by using Equation (23).

(Procedure UL1-3)

The received $SINRG_{n,UL} = \gamma_{k,m,UL}(j)$ of the signal n (=1, ..., $n_{max}$) when the selected MT and the beam are spatially multiplexed is estimated, based on Equation (21).

(Procedure UL1-4)

A throughput $\xi_{n,UL}$ of the signal n is calculated based on the received $SINRG_{n,UL}$, and a system throughput $\Xi_{UL}$ of the entire spatially multiplexed signal is calculated based on Equation (24).

[Numerical expression 23]

$$\Xi_{UL} = \sum_{n=1}^{nmax} \xi_{n,UL} \quad (24)$$

(Procedure UL1-5)

The operations of the above (procedure UL1-2) to the (procedure UL1-4) are carried out with respect to all the selected patterns of the MTs and the beams, in the range of $n_{max}=1, \ldots, N$ (N: the number of antennas of the BS). The number $n_{max}$ of spatially multiplexed with the highest system throughput, and the combination of the receiving MT#k and the beam $m_k$ thereof of the spatially multiplexed signal are also selected.

(Procedure UL1-6)

The MCS of the signal n (=1, ..., $n_{max}$) is determined from the received $SINRG_{n,UL}$ at the MT#k(n) of the signal n (=1, ..., $n_{max}$) obtained from the combination of the selected receiving MT#k and the beam $m_k$ thereof.

The throughput $\xi_{n,UL}$ and the MCS of one packet is a function determined in advance from the received SINR. An example is shown in FIG. 7.

An example of a spatial scheduling algorithm that determines the transmission destination MT#k(n) and the beam thereof of the n (=1, ..., nmax)-th spatially multiplexed signal in a sequence of n=1, 2, ..., with a low calculation amount will now be explained.

(Procedure UL2-1)

$n=1$ and $\Xi(0)=0$ (Procedure UL2-2)

Under the presence of the multiplexed signals 1 to (n−1), a reception weight when the signal n is transmitted with respect to the possible MT#k=1, ..., K and the beam of the MT, are calculated based on Equation (23). Then, based on Equation (21), the received SINR of the signal n at that time is estimated.

(Procedure UL2-3)

The MT#k and the beam $m_k$ in which the received SINR of the signal n becomes the maximum are selected as the transmitting MT and the reception beam of the multiplexed signal n.

(Procedure UL2-4)

A system throughput $\Xi(n)$ at the number n of the spatially multiplexed signal is calculated, and if it is "$\Xi(n)>\Xi(n-1)$", go to (procedure UL2-5). In the other event, go to (procedure UL2-6) as $n_{max}=n-1$. The system throughput is calculated using a method shown in the above (procedure UL1-4).

(Procedure UL2-5)

If "n<N", return to (procedure UL2-2). If "n=N", calculate the reception weights $w_{1,UL}, \ldots, w_{n,UL}$ based on Equation (23), and go to (procedure UL2-6) as $n_{max}=n$.

(Procedure UL2-6)

An MCS of each signal n (=1, ..., $n_{max}$) is determined from the received $SINRG_{n,UL}$ at the MT#k(n) of the signal n (=1, ..., $n_{max}$) that can be obtained under the combination of the selected $n_{max}$ pieces of receiving MT#k and the beam $m_k$ thereof.

With the above processes, the BS determines a combination (n=1, ..., $n_{max}$) of the transmitting MT#k(n), the reception weight $w_{n,UL}$ thereof, and the MCS. In the present algorithm, the spatially multiplexed signal is sequentially added thereto. The BS allows the n-th spatially multiplexed signal, if the system throughput of which the number of multiplexed signal is "n" is higher than the system throughput of which the number of multiplexed signal is "n−1".

With the present embodiment, it is possible to perform uplink spatial scheduling based on the received SINR. The reception beam determined by the present algorithm places a null in the direction of the entire receiving MT excluding the desired MT, thereby realizing efficient communication.

In the present embodiment, it is also possible to control the uplink transmission power. More specifically, after selecting the receiving MT#k(n) and the beam thereof by the algorithm, the transmission power coefficient a of the terminal in Equation (21) is changed, so as the received SINR becomes the required value. The coefficient a is notified to the terminal as control information in the downlink. In particular, if a Zero-Forcing weight is used, the interference from the entire spatially multiplexed signals excluding the desired signal is eliminated. Accordingly, it is possible to adjust the transmission power without being interfered with one another.

In this manner, in the present embodiment, the BS receives (acquires) more channel information, by receiving the pilot signals from each MT, in the specific segment different from the data packet transmission on the uplink. With this, based on the more information being obtained, a combination with high transmission efficiency can be selected from various combinations of the MTs and the transmission beams in the uplink spatial multiplexing. Accordingly, it is possible to improve the transmission efficiency.

Eighth Embodiment

An eighth embodiment will now be explained. The configurations of the wireless communication system, the BS, and the MT are the same as those in the first embodiment. In the fourth embodiment, the operation of transmitting the pilot signals (pilot A) for notifying beam information while taking into account the interference power performed by the MT, and estimating the received SINR in each beam of the MT, required to perform spatial scheduling performed by the BS was explained. However, not only the method shown in the fourth embodiment, but the spatial scheduling using the other methods can also be used. Therefore, in the present embodiment, a scheduling operation of transmitting pilot signals from each beam at equal transmission power performed by the MT is described.

If the MT transmits pilot signals at equal power without using the beam and the sub-band, it is "$I_m(j)=1$" in Equation (10) shown in the fourth embodiment. In this case, the MT transmits (corresponds to the state that $I_m^{(j)}$ is replaced by "1") the pilot signals at equal power, without using the interference power. If the BS carries out the same process as in the fourth embodiment, Equations (10) and (11) are expressed by Equation (25).

[Numerical Expression 24]

$$x_{BS}^{(j)}(p) = \sqrt{\eta} h_m^{(j)T} r_m^{(j)}(p) + z_{BS}^{(j)}(p)$$

$$\gamma_m^{(j)pre} = P_{BS,j} |h_m^{(j)} w_{DL}^{(j)}|^2 \quad (25)$$

In this case, $\gamma_m^{(j)pre}$ represents a received power level at the MT, and the BS can control transmission based on the received power level at the MT, instead of the received SINR criterion. In particular, the present control functions effectively if there is only noise and less interference from the surroundings.

In this manner, the BS can carry out the downlink spatial scheduling based on the received power of the terminal, even if the pilot signal that does not take into account the interference power is used. In such an event, various states can also be assumed, by notifying channel information based on the pilot signals (pilot A) in a specific segment different from the uplink data packet transmission. Subsequently, it is possible to select a combination of the MT and the transmission beam with the strong received power.

If the transmission method of the pilot signals shown in the fourth embodiment is used, a special advantage that can control transmission while taking into account interference can be achieved. However, the spatial scheduling of the present invention also functions effectively, even if the other transmission method (method of transmitting pilot signals at equal power as described above) of the pilot signals is used.

Ninth Embodiment

A ninth embodiment will now be explained. The configurations of the wireless communication system, the BS, and the MT of the present embodiment are the same as those in the first embodiment. In the present embodiment, as a specific example of the downlink (DL) transmission operation performed at "step #5A" shown in the first embodiment, when each packet includes an orthogonal pilot pattern, and the MT receives a packet by using an MMSE combining weight will be explained. One sub-band is focused here, and the explanation will be made by omitting a sub-band number j.

FIG. 8 is a schematic diagram of a state in which the BS is spatially multiplexing a packet in a downlink, and of the state that the BS is generating a transmission beam by using a transmission weight (such as w1) and transmitting the DL packet.

The packet to be transmitted is formed as shown in FIG. 5, and the preamble unit includes pilot signals (pilot F), terminal's ID, and MCS information of the subsequent data. The payload unit also includes data. The packets at the maximum of N pieces are spatially multiplexed. "N" indicates the number of antennas of the BS.

The receiving MT#k(n) and the transmission weight wn are changed based on the scheduling result. The n-th spatially multiplexed packet includes a unique pilot pattern (pilot F), and the pilot patterns of different spatially multiplexed packets are time-orthogonal.

The BS transmits a signal $(s_1(p), \ldots, s_{nmax}(p), E[|s_n(p)|2]=1)$ of the packet, using the different transmission beams based on the N×1 weight $(w_1, \ldots, w_{nmax}, |w_n|=1)$. By using the fixed transmission power Ps per transmission beam, the Mk×1 reception signal vector $x_k(p)$ of the p-th symbol in the MT#k is indicated by Equation (26). The "Mk" indicates the number of antennas of the MT#k. $z_k(p)$ is Mk×1 noise vector in the MT#k.

[Numerical expression 25]

$$x_k(p) = \sum_{n=1}^{nmax} \sqrt{Ps} \, (H_k w_n) s_n(p) + z_k(p) \quad (26)$$

The MT, on the arrival of the packet, calculates Mk×1 weight vector $w_{kn}$ of the MMSE combining criterion based on Equation (27), and calculates an appropriate reception beam, by using the unique pilot signal pattern with a spatially multiplexed packet. The signal $s_n(p)$ in the symbol p=1, ..., pmax represents the pilot signals (pilot F).

[Numerical expression 26]

$$w_{kn} = \left( \sum_{p=1}^{pmax} x_k(p) x_k^H(p) \right)^{-1} \left( \sum_{p=1}^{pmax} x_k(p) s_n^*(p) \right) \quad (27)$$

The MT#k checks the terminal's ID of the packet n with the output of the reception beam based on the weight $w_{kn}$. If the terminal's ID coincides with the terminal (terminal's ID of MT#k), the MT#k recognizes that the packet is addressed to the own terminal, and reads the MCS information. The MT#k also receives data based on the MCS. If the terminal's ID does not coincides, the MT#k stops receiving the packet, and proceeds to check the next packet. The above process is carried out to all the spatially multiplexed packets n=1, ..., $n_{max}$, and the MT#k receives the packet addressed to the own terminal. In the spatial scheduling, the terminal's ID, the transmission beam, and the MCS information of the transmission destination change at a certain period of time or in a sub-band unit. However, the MT can receive the packet addressed to the own terminal, by performing the present process at a certain period of time or in a sub-band unit.

In this manner, in the present embodiment, the weight convergence of the MMSE combining weight $w_{kn}$ at the MT can be performed at high speed, by using the orthogonal pilot pattern as the pilot signals (pilot F). With this, the MT can receive signal with higher accuracy.

In the above explanation, the MMSE combining weight is used as reception beam. However, it is not limited to this, and various combining methods such as the maximum ratio combining weight and the Zero-Forcing weight can be used.

Tenth Embodiment

A tenth embodiment will now be explained. The configurations of the wireless communication system, the BS, and the MT of the present embodiment are the same as those in the first embodiment. In the present embodiment, as a specific example of the uplink (UL) control information transmission operation performed at "step #5B" shown in the first embodiment, when the UL control information transmitted in the downlink and the uplink packet include orthogonal pilot signals that correspond one-to-one will be explained. One sub-band is focused here, and the explanation will be made by omitting a sub-band number j.

Figure 9:
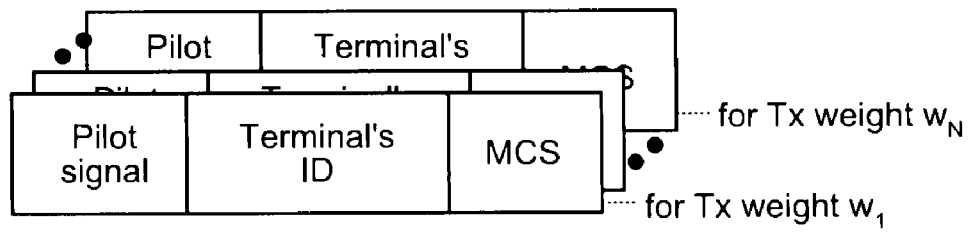
FIG. 9 is a schematic of a structure of a packet used for transmitting UL control information and a structure of a packet used for transmitting data in an uplink.
Figure 9:
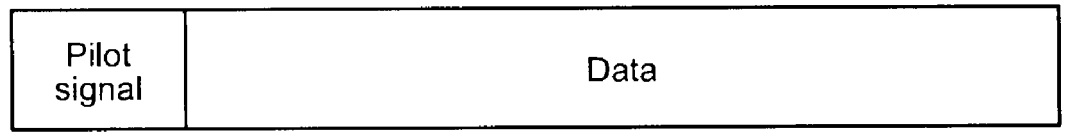

In the UL control information transmission, N pieces of different notification information n=1, ..., N is spatially multiplexed in the downlink (see FIG. 9). FIG. 9 is a schematic of a structure of a packet used for transmitting UL control information and a structure of a packet used for transmitting data in the uplink. The packet used for transmitting the UL control information is a "scheduling instruction slot" that includes a "pilot signal", "terminal's ID", and a "MCS". The packet used for transmitting data is a "data packet" that includes a "pilot signal" and "data".

The notification information to be transmitted is formed by a unique pilot signal (corresponds to pilot signal), transmission terminal's ID (corresponds to terminal's ID), and MCS information (corresponds to MCS). The different pieces of notification information include time-orthogonal pilot signals. At this time, the transmission terminal's ID and the MCS information are the transmission terminal's ID and the MCS information selected at n-th using UL spatial scheduling. The notification information may also include a beam number and transmission power information. If the number $n_{max}$ of spatially multiplexed signals at the UL is "$n_{max}<N$", the terminal's ID and the MCS information of the notification information $n_{max}+1, \ldots, N$ become blank.

As shown at step #5B in the first embodiment, the BS determines the transmission weights $w_1DL, \ldots, w_NDL$ that transmit the UL control information (notification information) $n=1, \ldots, N$, using Equation (5) shown in the first embodiment. In Equation (5), $b_1, \ldots, b_N$ corresponds to the response vector of the MT and the beam selected for transmitting the UL packet. If "$n_{max}<N$", $b_n$ when "$n=n_{max}+1, \ldots, N$" is sequentially selected as a vector $(b_n \perp b_1, \ldots, b_{n-1})$ orthogonal with respect to $b_1, \ldots, b_{n-1}$.

The present transmission beam corresponds to the Zero-Forcing weight with respect to N pieces of response vectors $b_1, \ldots, b_N$, and can transmit notification information at strong power in the direction of the MT to be notified. The BS transmits the n-th notification information based on the transmission weight $w_n^{DL}$ in the downlink.

Each MT, on the arrival of the notification slot, forms an appropriate reception beam based on the fixed pilot signal pattern for each piece of UL control information in the same manner as in the ninth embodiment. More specifically, with the output of the reception beam, the MT checks the terminal's ID of the notification information, and if the terminal's ID does not coincides with the own terminal's ID, proceeds to check the other (packet's) notification information. If the terminal's ID coincides with the own terminal's ID, the MT recognizes the transmission instruction in the uplink from the BS, and reads the MCS information after confirming the UL notification information number n from the unique pilot signal pattern. The MT also calculates the transmission weight $v_{UL,k}$, by using the beam number included in the UL notification information or the pilot signals included in the UL notification information, and Equation (6) shown in the first embodiment.

Figure 10:
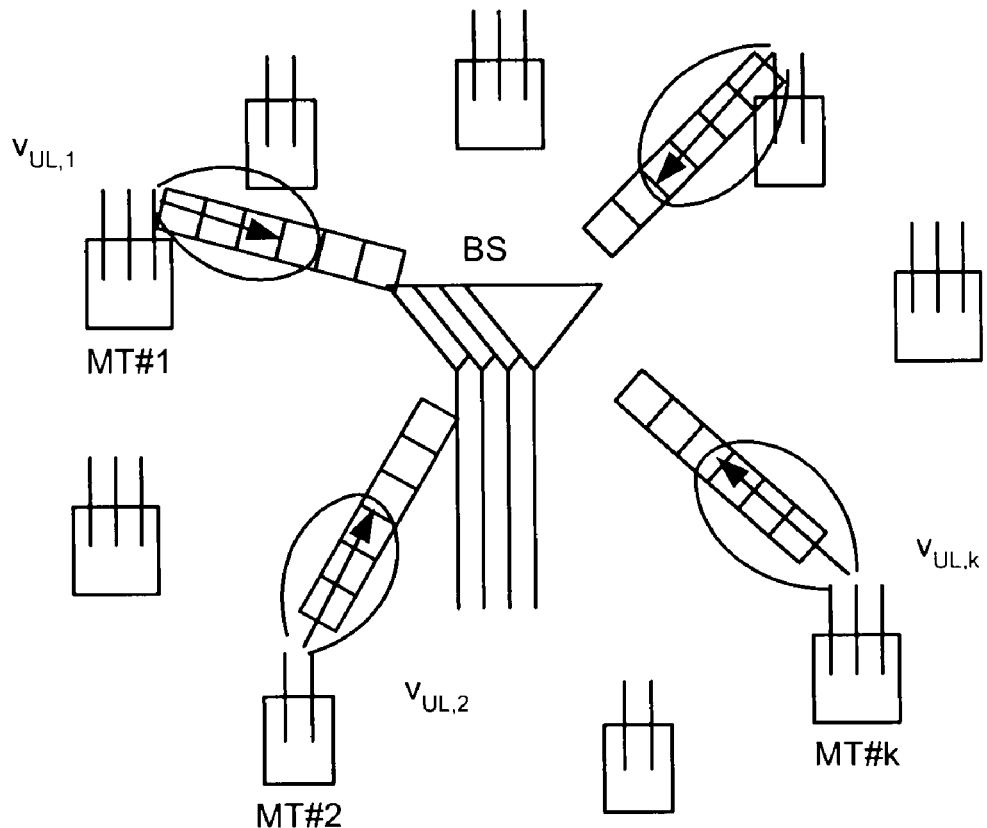
FIG. 10 is a schematic diagram of an example of a state in which the MT is spatially multiplexing a packet in the uplink.

The MT then generates a data signal according to the MSC assigned from the BS, and adds a unique pilot pattern that corresponds to the UL notification information number n. The MT then transmits the packet using the transmission weight $v_{UL,k}$ calculated in the above. At this time, the unique pilot patterns of the different packets in the uplink have time-orthogonal relationships. As described above, the packet transmitted by the MT is formed as the "data packet" shown in FIG. 9. FIG. 10 is a schematic diagram of an example of a state in which the MT is spatially multiplexing a packet in the uplink.

The BS forms an appropriate reception beam based on the pilot pattern, and receives a packet. Even if terminal's ID is not included in the packet, the BS recognizes that it is the n-th spatially multiplexed signal from the pilot pattern, and can specify the transmitting MT and the MCS assigned by the BS.

In this manner, when the UL control information and the uplink packet include the pilot signals that correspond one-to-one, the BS can identify the terminal's ID and the MCS, even if the terminal's ID and the MCS information are not transmitted in the uplink packet. As a result, the amount of control information included in the uplink packet can be reduced, thereby improving the transmission efficiency.

The configuration in which the pilot signals correspond one-to-one is indicated here. However, an identification number n that corresponds one-to-one in the UL control information and the uplink packet may be added instead. Even in this case, the BS can identify the terminal's ID and the MCS of the uplink packet from the identification number n, and the control information of the terminal's ID and the MCS information can be eliminated from the uplink packet, similar to when the pilot signals correspond one-to-one. Accordingly, the transmission efficiency can be improved.

By having the pilot pattern of the control information transmitted in the downlink and the pilot pattern of the packet transmitted in the uplink correspond one-to-one, the pilot patterns that are mutually orthogonal to each other can be used, when each MT transmits a packet in the uplink. As a result, the BS can calculate reception weight used to separate and receive the spatially multiplexed packet with high accuracy, by using the orthogonal pilot signals included in each packet. As an example, when a base station uses the MMSE combining weight, the base station calculates the MMSE combining reception weight by using the pilot signals of the spatially multiplexed signal, based on the similar process as Equation (27). At this time, if the spatially multiplexed signal includes the orthogonal pilot signals, the reception weight with higher accuracy can be calculated by the less number of pilot symbols.

In this manner, by spatially multiplexing the data packet using the orthogonal pilot symbol in the uplink based on the present embodiment, the more efficient signal transmission can be realized.

Eleventh Embodiment

An eleventh embodiment will now be explained. The configurations of the wireless communication system, the BS, and the MT according to the present embodiment are the same as those in the first embodiment. In the present embodiment, the detail of the ACK transmission operation in the uplink with respect to the reception packet in the downlink performed at "step #6A" shown in the first embodiment will be explained.

At "step #6A" in the first embodiment, the configuration of "calculating the Zero-Forcing weight of the desired packet based on the pilot F included in the DL packet, and transmitting the Ack signal using the weight as the transmission weight" was shown. This, for example, functions as follows.

Consider that the BS transmits spatially multiplexed signals $1, \ldots, n$ at the transmission weights $w_1, \ldots, w_n$, respectively, in the downlink. At this time, if the BS spatially multiplexes by using the Zero-Forcing weight, the transmission weight can be calculated by using Equation (15) shown in the fifth embodiment. As shown in the fifth embodiment, $v_n$ is a received vector of the n-th spatially multiplexed signal assumed by the BS, and if the beam $m_k$ of the MT#k receives thereof, it is $v_n=v_{k,m}$. At this time, Equation (16) is derived from Equation (15).

When focused on the MT#k(n) receiving the spatially multiplexed signal n, the following interpretation can be made:

The response vector of a DL spatially multiplexed signal 1 in the MT#k(n) can be expressed by $H_{k(n)}w_1$, in general. If the MT#k(n) uses the reception weight $v_n$, the combining output of the entire DL spatially multiplexed signal 1 excluding the signal n can be made 0, by using Equation (16). In other words, the weight $v_n$ is the Zero-Forcing weight at the MT#k (n) when the signal n is the desired signal, and corresponds to the Ack transmission weight shown at step #6A in the first embodiment.

If the MT#k(n) transmits the Ack by using the transmission weight $v_n$ in the uplink, the response vector at the BS is expressed by $H_{k(n)}Tv_n$. The BS, by using the reception weight $w_1$, can make the combining output of the response vector $H_{k(n)}Tv_n$ of the entire Ack signal excluding the Ack signal with respect to the signal 1 to 0, by using Equation (16). In other words, the BS can only receive the Ack of the signal 1, by using the reception weight $w_1$.

In this manner, when the MT calculates the Zero-Forcing weight of the desired DL packet and transmits the Ack signal using the weight as the transmission weight, even if the Ack signal is spatially multiplexed in the uplink, the BS can separate and receive the individual Ack signal by each weight $w_1$. As a result, even if the Ack signal is spatially multiplexed, the collision of the Ack signals will not occur. The relationships will be satisfied irrespective of the number N of the antennas of the BS, and the number Mk of the antennas of the MT.

In the above explanation, the MT calculated the Zero-Forcing weight. However, it is not limited to this, and even if the MMSE weight is used, the spatial multiplexing of the Ack in the uplink can be performed similarly. This is because the MMSE weight has the characteristic similar to the Zero-Forcing weight. Even if there is some control error, the BS can adjust the reception weight by using the pilot B transmitted simultaneously with the Ack, and a desired Ack signal can be efficiently extracted from the spatially multiplexed Ack signals.

In this manner, in the present embodiment, the detail of the ACK transmission operation performed in the uplink is explained. The reason why the ACK can be spatially multiplexed was theoretically shown.

Twelfth Embodiment

A twelfth embodiment will now be explained. The configurations of the wireless communication system, the BS, and the MT of the present embodiment are the same as those in the first embodiment. In the present embodiment, the detail of the ACK transmission operation performed in the downlink with respect to the reception packet in the uplink performed at "step #7" shown in the first embodiment will be explained.

At "step #7" in the first embodiment, the configuration in which the "BS calculates the Zero-Forcing weight with respect to each UL packet based on the pilot G, and transmits an ACK signal using the weight as the transmission weight" was shown. Similar to the eleventh embodiment, for example, this functions as follows.

Consider that the MT#k transmits the spatially multiplexed signal n in the uplink, by using the transmission weight $v_n$. The BS, at the reception thereof, calculates the Zero-Forcing weight $w_1$ that satisfies Equation (15) in the uplink. The weight $w_1$ corresponds to the transmission weight for Ack (Ack transmission weight) indicated at step #7 in the first embodiment. When the BS spatially multiplexes the Ack signal in the downlink, by using the Zero-Forcing weight $w_1$, by Equation (16), the MT#k can only receive the Ack signal related to the signal n, by using the weight $v_n$ also used when the uplink signal is transmitted as the reception weight.

In this manner, when the BS calculates a Zero-Forcing weight on the reception of each UL packet, and transmits the Ack signal of each packet using the weight as the transmission weight, even if the Ack signal is spatially multiplexed in the downlink, the MT can separate and receive the Ack signal addressed to the own terminal using the weight $v_n$. As a result, interference does not occur even if the Ack is spatially multiplexed.

In the above explanation, the BS calculated the Zero-Forcing weight. However, it is not limited to this, and the Ack can be spatially multiplexed in the downlink in the similar way, even if the MMSE weight is used. This is because the MMSE weight has the similar characteristic to the Zero-Forcing weight. Even if there is some control error, the Ack can be efficiently spatially multiplexed, by having the MT adjusting the reception weight, using the pilot C transmitted simultaneously with the Ack.

In this manner, in the present embodiment, the detail of spatially multiplexing the ACK in the downlink with respect to the UL packet was explained. The reason why the ACK can be spatially multiplexed in the downlink was theoretically shown.

Thirteenth Embodiment

At steps #5A and 5B in the first embodiment, the configuration of spatially multiplexing the control information such as the MCS and the terminal's ID in the TDD system was explained. However, the "spatial multiplexing of control information", which is one of the present invention, is not limited to the TDD system, and may be applicable for a frequency division duplexing (FDD), by replacing steps #2 to #5B shown in the first embodiment to the following configurations.

In the FDD system, the BS forms a plurality of transmission beams and transmits pilot signals in the downlink. There are various transmission beamforming systems, and for example, a method of forming a plurality of transmission beams using a unitary matrix is known. The pilot signals are transmitted in different patterns by each transmission beamforming.

At the MT, each pilot signal transmitted from the transmission beams is received, and the channel quality is measured. Each MT also notifies the number of the pilot signal (correspond one-to-one to transmission beam of BS) with good quality and the channel quality to the BS in the uplink. In the FDD uplink, it is generally transmitted as a control information bit.

Notified in the uplink, the BS can recognize the channel quality information and an appropriate transmission beam in the downlink at the MT. Therefore, the BS can notify the control information in good quality to the MT, by selecting one transmission beam of which the MT can achieve good channel quality, and notifying the control information to the MT. By forming the transmission beams, the BS can also simultaneously transmit the control information to the different MT, by using an individual transmission beam. In other words, the BS can spatially multiplex the control information, by forming a transmission beam of which the MT can receive in good quality, based on the channel quality information from the MTs.

As a result, each MT can receive the required control information from the BS in the downlink. In the existing wireless communication (conventional wireless communication), the spatial multiplexing of the control information is not carried out, and the BS is formed so as all the MTs can receive control information without error. However, as described in the present embodiment, by spatially multiplexing control information, it is possible to reduce wireless resources required for transmitting the control information.

On the other hand, if the spatial multiplexing of control information, which is one of the present invention, is carried out, the control information can be received by the target MT, but there is a possibility that the same control information cannot be received by the other MTs. This is because although the BS is aware that the good reception quality can be obtained in the target MT, but is not aware of the reception quality at the other MTs. However, there will be no problem if the control information required for receiving packet in the downlink scheduling is correctly received at least by the MT that is the reception target. In other words, even if the other MTs cannot receive the correct control information, the system control will not have any problem, by detecting the reception error and skipping the reception of the control information. Similarly, even if the control information of uplink scheduling is transmitted in the downlink, if the control information can be correctly received at the MT, which is the transmission target of the uplink packet, the uplink scheduling will not be affected even if the other MTs do not receive the correct control information. By using the characteristic, the spatial multiplexing of the control information can be achieved, by notifying the transmission control information of the downlink and the uplink packets to the target MT with high communication quality, and by designing so as the other MTs may not need to receive the control information. As a result, it is possible to transmit control information with high efficiency, by using less wireless resources than in the related art.

The above control information mainly relates to the packet transmission in the downlink and the uplink. However, aside from this, there is also control information notified to all the MTs supported by the BS. In this case, the BS needs to transmit control information by using an omni-directional antenna, to notify all the MTs.

Accordingly, in the present invention, the control information of which only the target MT needs to receive, is transmitted by the BS using transmission beam. The control information required by many MTs supported by the BS, may be notified without having the transmission beamforming performed by the BS. In this manner, the present invention also includes a configuration whether the transmission beamforming is used according to the type of control information. If the transmission beamforming is used according to the type of control information, there is an advantage that the control information can be received with strong power at the target MT, even if the spatial multiplexing is not carried out. Therefore, even if the control information is not spatially multiplexed (even if 1MT is notified by one transmission beamforming), it is possible to obtain an advantage of the transmission beam, than when the control information is transmitted in all directions. In this manner, the present invention includes two different ideas: whether the transmission beamforming is used according to the type of control information, and spatial multiplexing of the control information. These ideas are applicable irrespective of the system such as the TDD and the FDD.

In the first embodiment, the terminal's ID, the MCS and the like are shown as the control information. However, even if the terminal's ID and the MCS are not indicated as a specific information bit, any control information that can confirm the terminal's ID and the MCS may be used. In the recent wireless communication, there is a configuration that each MT blind receives control signals by using an error detection bit, by determining the configuration of the error detection bit of the coding based on the terminal's ID. The control information that can indirectly obtain the terminal's ID in this manner is also included therein. In terms of the MCS, there is also a method of notifying the number of symbols used for data size and transmission of the transmission packet, other than specifically notifying the encoding ratio and information bit of the modulation system. Even in this case, the number of bits per one symbol can be calculated from the received information and the MCS can be specified based on the calculation result. Accordingly, it can be considered that the control information is related to the MSC. In this manner, the control information in the present invention may be any control information if the terminal's ID and the MCS can be confirmed, and does not need to be the one that specifically expresses the terminal's ID and the MCS as a bit.

INDUSTRIAL APPLICABILITY

As described above, the wireless communication system and the communication control method according to the present invention are advantageously applicable to wireless communication, and more specifically, in the wireless communication system of the TDD system, are suitable for the wireless communication system and the communication control method that perform highly efficient spatial multiplexing.

The invention claimed is:

1. A wireless communication system comprising:
a base station including a plurality of antennas; and
a plurality of mobile stations,
the base station being configured to communicate with each of the mobile stations using a time division duplex spatial multiplex transmission protocol,
each of the mobile stations including
a transmission weight calculating unit configured to measure a condition of a transmission path between the mobile station and the base station based on a transmitted identifiable known signal and calculate a transmission weight based on the measured condition, and
a known signal transmitting unit configured to transmit a first known pilot signal to the base station using the transmission weight,
the base station including
a scheduling unit configured to generate partial space information for each of the mobile stations based on the first known pilot signal received from the mobile stations, and, based on the partial space information, perform downstream scheduling to determine a downstream scheduling result specifying mobile stations concurrently receiving data and transmission beams used for downlink communications and upstream scheduling to determine an upstream scheduling result specifying mobile stations concurrently transmitting data and transmission beams used for uplink communications, and
a scheduling result transmitting unit configured to transmit packet including the upstream scheduling result and a second known pilot signal to the mobile stations, and
the transmission source mobile stations being further configured to receive the upstream scheduling result using a reception weight generated based on the second known pilot signal included in the packet, and transmit data based on the upstream scheduling result.

2. The wireless communication system according to claim 1, wherein the known signal transmitting unit of each of the mobile stations are further configured to concurrently transmit the first known pilot signal using a spatial multiplexing protocol.

3. The wireless communication system according to claim 1, wherein the scheduling result transmitting unit is further configured to transmit the packet including the second known pilot signal using a spatial multiplexing protocol.

4. The wireless communication system according to claim 3, wherein the second known pilot signal includes an orthogonal code.

5. The wireless communication system according to claim 1, wherein the scheduling result transmitting unit is further configured to generate a transmission weight based on a response vector of a beam at a time of receiving the first known pilot signal and the upstream scheduling result, and spatially multiplex the packet by using the generated transmission weight.

6. The wireless communication system according to claim 1, wherein
the base station further includes a known signal information notifying unit configured to notify the mobile stations of a number of first known pilot signals and a pattern of each of the first known pilot signals in advance, in each of the mobile stations, the transmission weight calculating unit is further configured to calculate transmission weights in good conditions based on the number of first known pilot signals, and the known signal transmitting unit of each of the mobile stations is further configured to transmit first known pilot signals including the patterns notified in advance using the calculated transmission weights.

7. The wireless communication system according to claim 6, wherein the first known pilot signals comprise orthogonal codes.

8. The wireless communication system according to claim 1, wherein the transmission weight calculating unit of each of the mobile stations is further configured to calculate the transmission weight such that an interference signal to the base station is suppressed.

9. The wireless communication system according to claim 1, wherein the base station further includes a downlink data packet transmitting unit configured to transmit a downstream data packet including user data and a third known pilot signal, and each of the mobile stations further includes an upstream Ack transmitting unit configured to calculate, upon receiving the downstream data packet and based on the third known pilot signal, an upstream Ack transmission weight, and return an upstream Ack packet including a fourth known pilot signal using the upstream Ack transmission weight.

10. The wireless communication system according to claim 9, wherein, when plural destination mobile stations concurrently receive the downstream data packet transmitted from the base station, the upstream Ack transmitting unit of each of the destination mobile stations concurrently returns the upstream Ack packet using a spatial multiplexing protocol.

11. The wireless communication system according to claim 9, wherein the third known pilot signal and the fourth known pilot signal are in a one-to-one corresponding relationship.

12. The wireless communication system according to claim 1, wherein each of the mobile stations further includes an uplink data packet transmitting unit configured to transmit an upstream data packet including user data and a fifth known pilot signal, and the base station further includes a downstream Ack transmitting unit configured to calculate a downstream Ack transmission weight based on the fifth known pilot signal included in the upstream data packet, and return a downstream Ack packet including a sixth known pilot signal using the downstream Ack transmission weight.

13. The wireless communication system according to claim 12, wherein, when the base station concurrently receives upstream data packets from transmission source mobile stations, the downstream Ack transmitting unit returns the Ack packet using a spatial multiplexing protocol.

14. The wireless communication system according to claim 12, wherein the fifth known pilot signal and the sixth known pilot signal are in a one-to-one corresponding relationship.

15. The wireless communication system according to claim 12, wherein the second known pilot signal and the fifth known pilot signal are in a one-to-one corresponding relationship.

16. The wireless communication system according to claim 1, wherein the scheduling unit is further configured to divide an entire band allocated to the system into a sub-bands each having an approximately uniform bandwidth, to allocate each of the mobile stations to a group of the sub-bands, and to perform scheduling in units of the groups of the sub-bands.

17. The wireless communication system according to claim 16, wherein upon receiving a request for changing a sub-band group from one of the mobile stations, the scheduling unit is further configured to change the group of sub-bands allocated to the one of the mobile stations based on a content of the request.

18. The wireless communication system according to claim 16, wherein the scheduling unit is further configured to calculate, based on the first known pilot signal received from the mobile stations, a response vector of each beam, and allocate mobile stations corresponding to response vectors with a high correlation from among calculated response vectors to different groups of sub-bands.

19. A communication control method between a base station including a plurality of antennas and a plurality of mobile stations using a time division duplex spatial multiplexing communications protocol, comprising:

measuring, by each of the mobile stations, a condition of a transmission path between the mobile station and the base station based on a transmitted identifiable known signal;

calculating, by each of the mobile stations, a transmission weight based on the measured condition of the transmission path between the mobile station and the base station;

transmitting, from each of the mobile stations, a first known pilot signal to the base station using the transmission weight of the mobile station;

generating, by the base station, partial space information for each of the mobile stations based on the first known pilot signal received from each of the mobile stations;

performing, based on of the partial space information, downstream scheduling to determine a downstream scheduling result specifying mobile stations concurrently receiving data and transmission beams used for downlink communications and upstream scheduling to determine an upstream scheduling result specifying mobile stations concurrently transmitting data and transmission beams used for uplink communications;

transmitting, by the base station, a packet including the upstream scheduling result and a second known pilot signal to the mobile stations;

receiving, by each of the mobile stations, the upstream scheduling result using a reception weight generated based on the second known pilot signal included in the packet, and;

transmitting, by each of the mobile stations, data based on the upstream scheduling result.

20. The communication control method according to claim 19, wherein the transmitting the first known pilot signal further includes concurrently transmitting the first known pilot signal using a spatial multiplexing protocol.

21. The communication control method according to claim 19, wherein the transmitting the packet including the upstream scheduling result and the second known pilot signal further includes transmitting the packet including the second known pilot signal using a spatial multiplexing protocol.

22. The communication control method according to claim 21, wherein the second known pilot signal includes an orthogonal code.

23. The communication control method according to claim 19, further comprising:
generating a transmission weight based on a response vector of a beam at a time of receiving the first known pilot signal and the upstream scheduling result; and
spatially multiplexing the packet by using the generated transmission weight.

24. The communication control method according to claim 19, further comprising:
notifying the mobile stations of a number of first known pilot signals and a pattern of each of the first known pilot signals in advance;
calculating transmission weights in good conditions as based on the number of the first known pilot signals; and
transmitting first known pilot signals including the patterns notified in advance using the calculated transmission weights.

25. The communication control method according to claim 24, wherein of the first known pilot signals comprise orthogonal codes.

26. The communication control method according to claim 19, wherein the calculating the transmission weight further includes calculating the transmission weight such that an interference signal to the base station is suppressed.

27. The communication control method according to claim 19, further comprising:
transmitting a downstream data packet including user data and a third known pilot signal; and
calculating, upon receiving the downstream data packet and based on the third known pilot signal, an upstream Ack transmission weight, and returning an upstream Ack packet including a fourth known pilot signal using the upstream Ack transmission weight.

28. The communication control method according to claim 27, wherein, when plural destination mobile stations concurrently receive the downstream data packet transmitted from the base station, the returning the upstream Ack further includes returning the upstream Ack packet using a spatial multiplexing protocol.

29. The communication control method according to claim 27, wherein the third known pilot signal and the fourth known pilot signal are in a one-to-one corresponding relationship.

30. The communication control method according to claim 19, further comprising:
transmitting an upstream data packet including user data and a fifth known pilot signal; and
calculating a downstream Ack transmission weight based on the fifth known pilot signal; and
returning a downstream Ack packet including a sixth known pilot signal using the downstream Ack transmission weight.

31. The communication control method according to claim 30, wherein when the base station concurrently receives upstream data packets from transmission source mobile stations, the returning the downstream Ack packet further includes returning the downstream Ack packet using a spatial multiplexing protocol.

32. The communication control method according to claim 30, wherein the fifth known pilot signal and the sixth known pilot signal are in a one-to-one corresponding relationship.

33. The communication control method according to claim 30, wherein the second known pilot signal and the fifth known pilot signal are in a one-to-one corresponding relationship.

34. The communication control method according to claim 19, wherein performing downstream scheduling further includes
dividing an entire band allocated to the system into sub-bands each having an approximately uniform bandwidth,
allocating mobile stations to a group of the sub-bands, and
performing scheduling in units of the groups of the sub-bands.

35. The communication control method according to claim 34, wherein, upon receiving a request for changing a sub-band group from one of the mobile stations, the performing downstream scheduling further includes changing the group of sub-bands allocated to the one of the mobile stations based on a content of the request.

36. The communication control method according to claim 34, wherein the performing downstream scheduling further includes
calculating, based on the first known pilot signal received from the mobile stations, a response vector of each beam, and
allocating mobile stations corresponding to response vectors with a high correlation from among calculated response vectors to different groups of sub-bands.

* * * * *